United States Patent [19]

Izumi et al.

[11] Patent Number: 5,598,392
[45] Date of Patent: Jan. 28, 1997

[54] DATA REPRODUCTION SYSTEM SYNCHRONIZED BY RECORDING DATA

[75] Inventors: Haruhiko Izumi; Masakazu Taguchi, both of Kawasaki, Japan

[73] Assignee: Fujitsu Limited, Japan

[21] Appl. No.: 289,231

[22] Filed: Aug. 11, 1994

[30] Foreign Application Priority Data

Nov. 9, 1993 [JP] Japan .................................. 5-279942
Dec. 27, 1993 [JP] Japan .................................. 5-333356

[51] Int. Cl.$^6$ ........................................ G11B 7/00
[52] U.S. Cl. ................... 369/59; 369/124; 369/48
[58] Field of Search ........................ 365/54, 58, 48, 365/13, 59, 32, 124; 375/368, 354; 360/65, 45, 32

[56] References Cited

U.S. PATENT DOCUMENTS

| | | | |
|---|---|---|---|
| 5,363,352 | 11/1994 | Tobita et al. | 369/47 |
| 5,400,189 | 3/1995 | Sato et al. | 360/65 |
| 5,420,893 | 5/1995 | Ward | 365/13 |
| 5,450,389 | 9/1995 | Hayashi | 369/59 |
| 5,455,813 | 10/1995 | Hayashi | 369/124 |
| 5,469,415 | 11/1995 | Fujita et al. | 369/59 |

FOREIGN PATENT DOCUMENTS 430327  2/1992  Japan .
490168  3/1992  Japan .

*Primary Examiner*—Nabil Hindi
*Attorney, Agent, or Firm*—Greer, Burns & Crain, Ltd.

[57] ABSTRACT

A data reproducing system obtains a reproduction signal via a head from an optical disk recording medium in which signals obtained by modulation of recording data in accordance with a rule corresponding to a partial response characteristic have been recorded and generates a data signal corresponding to the recording data based on the reproduction signal. The data reproducing system includes a clock generator for generating a synchronizing clock based on the reproduction signal, and a signal generating unit, operating in synchronism with the synchronizing clock generated by the clock generator, for sampling levels of the reproduction signal and for generating the data signal from the sampled levels in accordance with a maximum likelihood sequence estimation method.

9 Claims, 22 Drawing Sheets

$def_k = a_{k1} \cdot \overline{a_{k2}} \cdot \overline{m_{k1}} \cdot m_{k2}$ $der_k = \overline{a_{k1}} \cdot a_{k2} \cdot m_{k1} \cdot \overline{m_{k2}}$

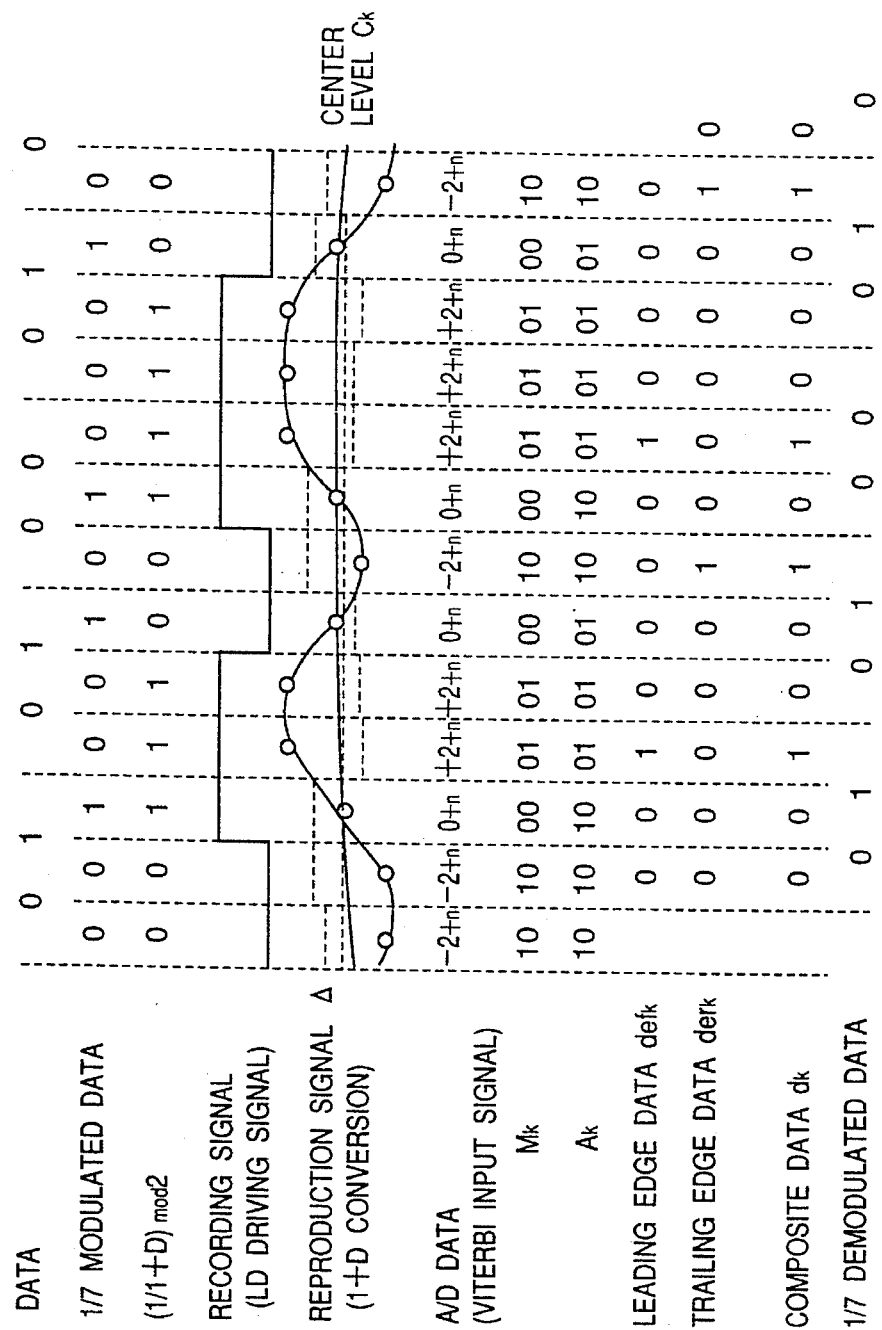

DATA REPRODUCTION SYSTEM SYNCHRONIZED BY RECORDING DATA

BACKGROUND OF THE INVENTION (1) Field of the Invention

The present invention generally relates to a data reproduction system applicable to an optical disk unit such as a magnetooptical disk unit, and more particularly to a data reproduction system for generating data signals corresponding to recorded data from signal wave forms reproduced from an optical disk in which data has been recorded based on a partial response characteristic.

(2) Description of the Related Art

In an external memory unit, for example a magnetooptical disk unit, data recording/reproducing in accordance with a partial response maximum likelihood (PRML) method has been proposed to increase the capacity. In data recording in accordance with the partial response characteristic, the intersymbol interference is positively utilized, and recording data is coded in accordance with patterns of predetermined inter-symbol interference. In maximum likelihood sequence estimation (MLSE), a reproduced signal is decoded so that a signal value having a strongest likelihood is obtained from among a plurality of signal values.

An essential structure of a magnetooptical disk unit in which the data recording/reproducing is performed in accordance with the partial response maximum likelihood method is shown in FIG. 1. In FIG. 1, parts not related to the data recording/reproducing are omitted therefrom.

Referring to FIG. 1, a magnetooptical disk 4 which is a recording medium is rotated at a predetermined speed by a spindle motor 6. A magnetooptical head assembly 3 and a magnetic field generating unit 5 are provided adjacent to the magnetooptical disk 4. The magnetooptical head assembly 3 includes a laser diode which is an optical source. The magnetic field generating unit 5 generates a magnetic field in a direction perpendicular to a surface of the magnetooptical disk 4. A recording system for data has a precoder 1 and a driving circuit 2. The pre-coder 1 codes recording data supplied from a control unit (not shown) in accordance with a partial response characteristic. The driving circuit 2 drives the laser diode of the magnetooptical head assembly 3 based on the coded data from the precoder 1. Due to a heat function of the laser beam from the laser diode and the magnetic field generated by the magnetic field generating unit 5, recording marks arranged in accordance with magnetization patterns corresponding to the coded data are formed on the magnetooptical disk 4. A reproducing system for data has a PLL (Phase Locked Loop) circuit 7, a data PLL circuit 8, a delay circuit 9 and a maximum likelihood data detecting circuit 10. Servo pits (wobbled pits) are formed on the magnetooptical disk 4. In the case of reading data, the magnetooptical head assembly outputs a periodic signal (a wobbled pit signal) corresponding to the laser beam reflected by the servo pits. In the PLL circuit 7, a phase synchronization between a reference clock signal and the wobbled pit signal is accomplished, so that a clock signal is generated. This clock signal is further processed by the data PLL circuit 8 and the delay circuit 9 and supplied to the maximum likelihood data detecting circuit 10. The maximum likelihood data detecting circuit 10 operates in synchronism with the above clock signal, and reproduces data signals corresponding to edges of data recording marks from reproduced signal waveforms obtained from the magnetooptical head assembly 3. In the maximum likelihood data detecting circuit 10, a transition path for data values having the maximum likelihood is decided based on signal values sampled in synchronism with the clock signal, and signal values to be reproduced based on the transition path are decided.

Due to sensitivity variation of the magnetooptical disks, circumstantial temperature variation in a data recording process, and the variation of the optical point control, the size (the length in a direction in which a track extends) of a mark formed on the magnetooptical disk is varied. When the size of the mark is varied, the reproduced signal waveform obtained from the magnetooptical disk is varied. Particularly, since data signals corresponding to the edges of data recording marks are reproduced by the maximum likelihood data detecting circuit 10, in a reproduction data signal corresponding to front edges of the recording marks and a reproduction data signal corresponding to tail edges of the recording marks, directions in which phases of both the reproduction data signals are varied along with the variation of the size of each recording mark differ from each other. Thus, it is difficult to reproduce actual data signals by using an external clock signal without accounting for an influence of the variation of the size of each recording mark.

SUMMARY OF THE INVENTION

Accordingly, a general object of the present invention is to provide a novel and useful data reproducing system in which the disadvantages of the aforementioned prior art are eliminated.

A specific object of the present invention is to provide a data reproducing system in which the data reproduction signals can be generated by using the maximum likelihood sequence estimation.

Another object of the present invention is to provide a data reproducing system in which, even if the size of each recording mark formed on an optical disk is varied, the data signal can be accurately generated.

The above objects of the present invention are achieved by a data reproducing system obtaining a reproduction signal via a head from an optical disk recording medium in which signals obtained by modulation of recording data in accordance with a rule corresponding to a partial response characteristic have been recorded and generating a data signal corresponding to the recording data based on the reproduction signal, said data reproducing system comprising: clock generating means for generating a synchronizing clock based on the reproduction signal; and signal generating means, operating in synchronism with the synchronizing clock generated by said clock generating means, for sampling levels of the reproduction signal and for generating the data signal from the sampled levels in accordance with a maximum likelihood sequence estimation method.

According to the present invention, when the data signal corresponding to the recording data is generated from the recording medium in which the data is recorded based on the partial response characteristic, the synchronizing clock is generated based on the reproduction signal waveform and the data signal is generated by using the synchronizing clock. Thus, even if the size of each recording mark representing the recording data is varied, the data signal can be accurately generated.

BRIEF DESCRIPTION OF THE DRAWINGS

Other objects, features and advantages of the present invention will become more apparent from the following detailed description when read in conjunction with the accompanying drawings, in which:

FIG. 21 is a timing chart illustrating the signal processing in the recording system and the reproducing system.

DESCRIPTION OF THE PREFERRED EMBODIMENTS

A description will be given of an embodiment of the present invention.

Figure 1:
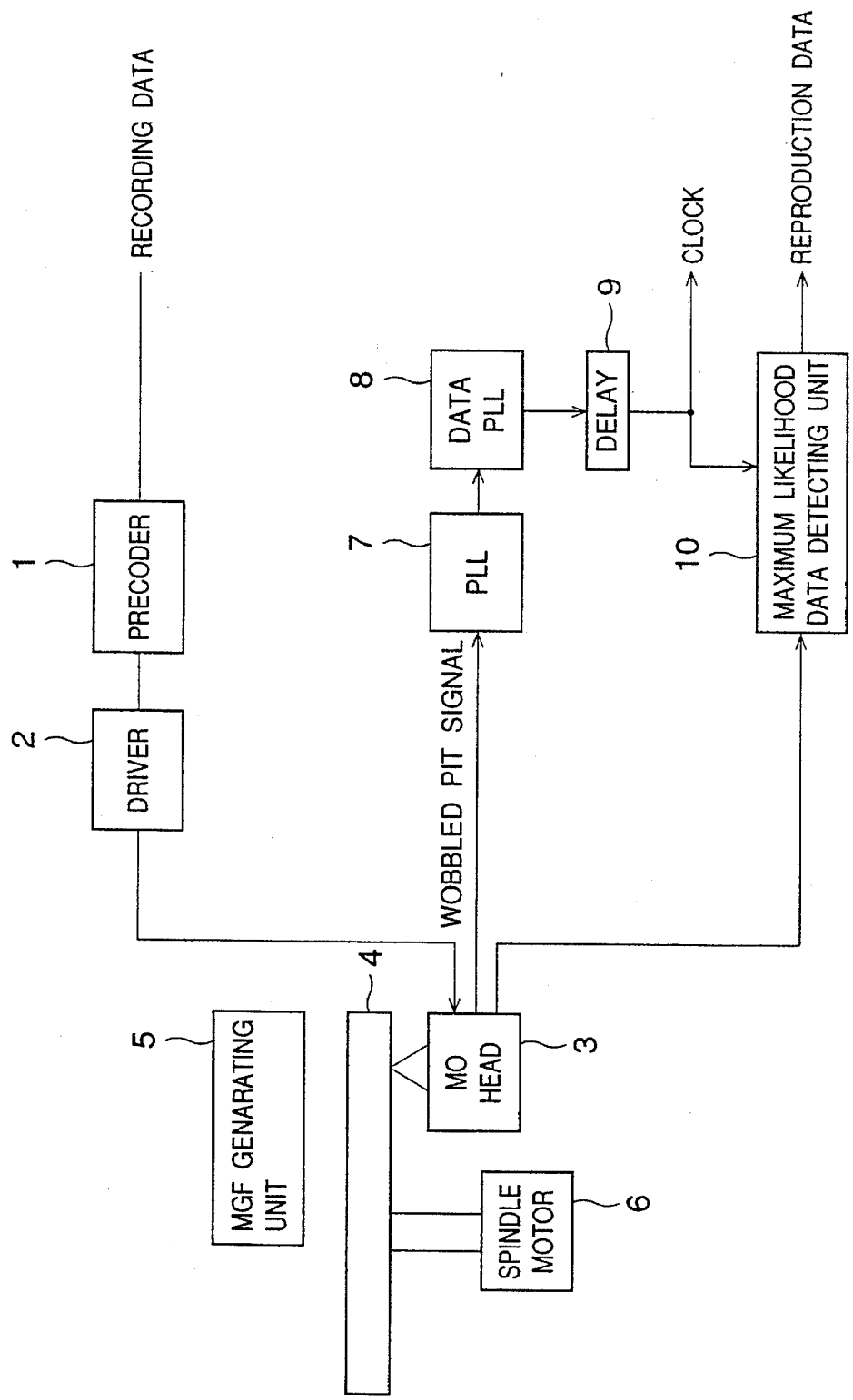
FIG. 1 is a block diagram illustrating a conventional magnetooptical disk unit.

A magnetooptical disk unit according to this embodiment of the present invention has the same recording/reproducing mechanism as that shown in FIG. 1 (the magnetooptical head assembly 3, the magnetooptical disk 4, the magnetic field generating unit 5 and the spindle motor 6. The magnetooptical disk unit also has the same recording system as that shown in FIG. 1 (the pre-coder 1 and the driving circuit 2). The data reproducing system generating data signals based on the reproduction signals output from the magnetooptical head assembly 3 is formed as shown in FIG. 2.

Figure 2:
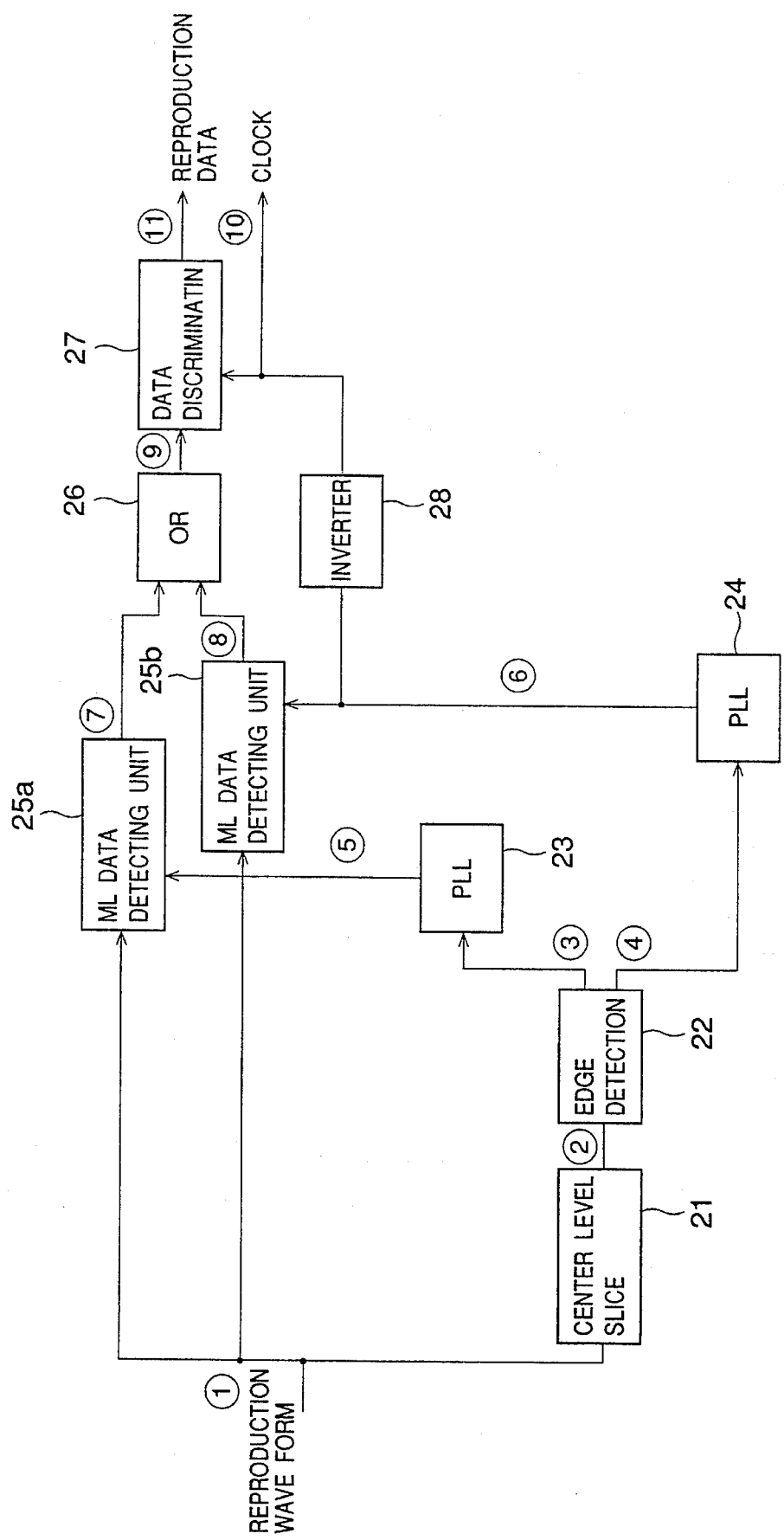
FIG. 2 is a block diagram illustrating a data reproducing system according to an embodiment of the present invention.

The data reproducing system shown in FIG. 2 has a first system for generating synchronizing clocks and a second system for generating the data signals.

First, the first system has a center level binarizing circuit 21, an edge detecting circuit 22, a first PLL circuit 23, a second PLL circuit 24 and an inverter circuit 28. The center level binarizing circuit 21 generates a binary signal from the reproduction signal waveform by using a reference level Lc corresponding to the center of the amplitude of the reproduction signal waveform (1). The edge detecting circuit 22 detects the leading edge and the trailing edge of a binary signal (2) supplied from the center level binarizing circuit 21. The edge detecting circuit 22 outputs a leading edge detecting signal (3) corresponding to the leading edge and a trailing edge detecting signal (4) corresponding to the trailing edge. The first PLL circuit 23 generates a leading edge synchronizing clock (5) based on the leading edge detecting signal (3). The second PLL circuit 24 generates a trailing edge synchronizing clock (6) based on the trailing edge detecting signal (4).

Figure 3:
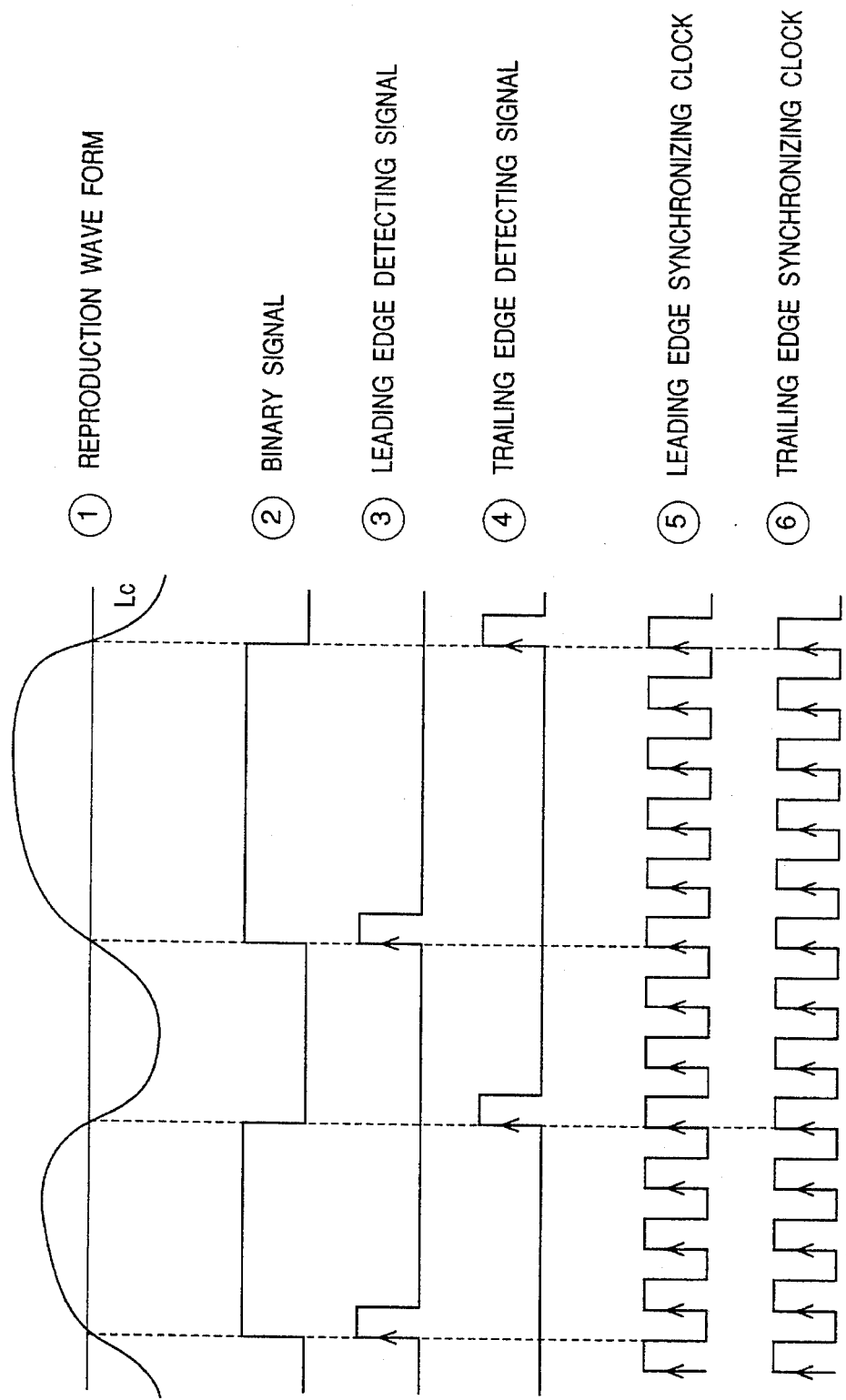
FIG. 3 is a timing chart illustrating generation of synchronizing clock signals.

The states of the above signals (1)–(6) are shown in FIG. 3.

The binary signal (2) output from the center level binarizing circuit 21 has a high level when the reproduction signal waveform has the amplitude equal to or greater than the reference level Lc. The phase of the leading edge synchronizing clock (5) is synchronized with the leading edge of the binary signal (2), and the phase of the trailing edge synchronizing clock (6) is synchronized with the trailing edge of the binary signal (2).

The leading edge synchronizing clock (5), the trailing edge synchronizing clock (6) and a synchronizing clock (10) output from the inverter circuit 28 are supplied to the second system.

The second system has a first maximum likelihood data detecting circuit 25a, a second maximum likelihood data detecting circuit 25b, an OR circuit 26 and a data discriminating circuit 27. The first maximum likelihood data detecting circuit 25a operates in synchronism with the leading edge synchronizing clock (5) from the first PLL circuit 23, and generates a leading edge data signal (7) corresponding to the leading edge of the reproduction signal waveform (1) in accordance with the maximum likelihood sequence estimation method. The second maximum likelihood data detecting circuit 25b operates in synchronism with the trailing edge synchronizing clock (6) from the second PLL circuit 24, and generates a trailing edge data signal (8) corresponding to the trailing edge of the reproduction signal waveform (1). The OR circuit 23 makes a logical sum of the leading edge data signal (7) output from the first maximum likelihood data detecting circuit 25a and the trailing edge data signal (8) output from the second maximum likelihood data detecting circuit 25b, so that a composite signal (9) of the leading edge data signal (7) and the trailing edge signal (8) is output from the OR circuit 26. The data discriminating circuit 27 performs data discrimination of the composite signal (9) based on the synchronizing signal (10). The output signal from the data discriminating circuit 27 is supplied as a reproduction data signal (11) to a demodulation unit (not shown). The demodulation unit operates in synchronism with the synchronizing signal (10), and demodulates the recording data from the reproduction data signal (11).

Figure 6A:
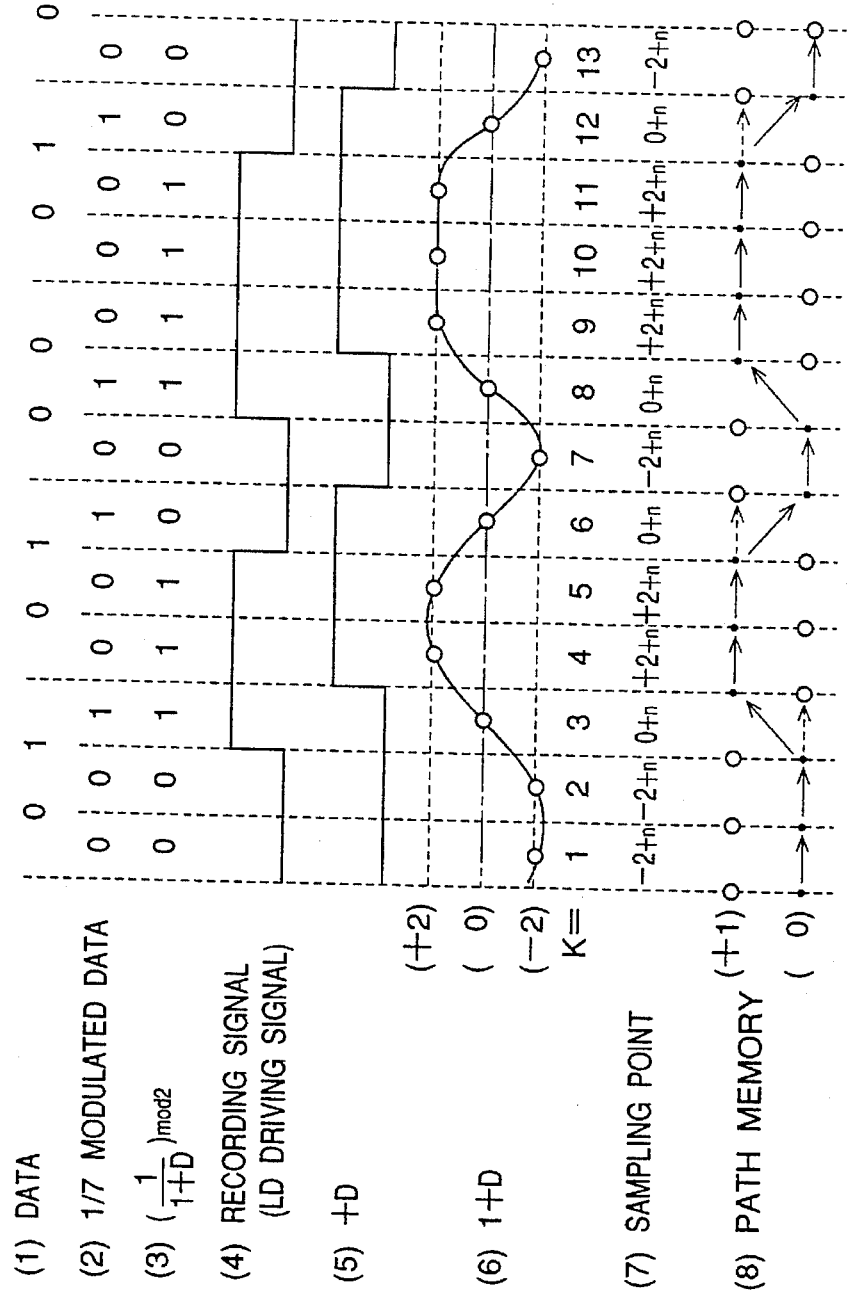
FIG. 6A is a timing chart illustrating signal processing in a recording system and a reproducing system.

In the recording system, the recording data (bit sequence) is modulated in a $1/7$ modulation form, the $1/7$ modulation data obtained by the modulation is further coded in a $[1/(1+D)]_{mod2}$ coding form by the precoder 1 so that a coded data corresponds to a class 1 characteristic of the partial response. The driving circuit 2 drives the laser diode based on a laser driving signal corresponding to the coded data obtained by the $[1/(1+D)]_{mod2}$ coding. The states of the above data are shown, for example, in FIG. 6A (1), (2), (3) and (4). Referring to FIG. 6A, the ½ modulation data (2) has bits corresponding to edges of the recording signal (the laser driving signal) (4) which are "1". That is, in the above data reproducing system, the first and second maximum likelihood data detecting circuits 25a and 25b generate the data signals corresponding to the edges (the leading edge and the trailing edge) of the reproduction signal waveform. This generated data signal corresponds to the ½ modulation data.

In the respective maximum likelihood data detecting circuits 25a and 25b, when a likelihood data is detected in the input signal, a maximum likelihood data transition path leading to the detected data is decided, and data on the maximum likelihood data transition path is decided as recording signal data to be reproduced. Between recording signal data "+1" and "0" there may be the following four data transition paths:

a data transition path from "1" to "1", a data transition path from "0" to "0", a data transition path from "1" to "0", and a data transition path from "0" to "1".

The data transition path from "1" to "1" corresponds to a value "+2" of the signal obtained by the (1+D) conversion as shown in FIG. 6A (6). This data transition state is defined as "+ merge". The data transition path from "0" to "0" corresponds to a value "−2" of the signal obtained by the (1+D) conversion. This data transition state is defined as "− merge". The data transition paths from "0" to "1" and from "1" to "0" correspond to a value "0" of the signal obtained by the (1+D) conversion. A state where neither the data transition path "0" to "1" nor the data transition path "1" to "0" is selected is defined as "no merge".

Figure 4:
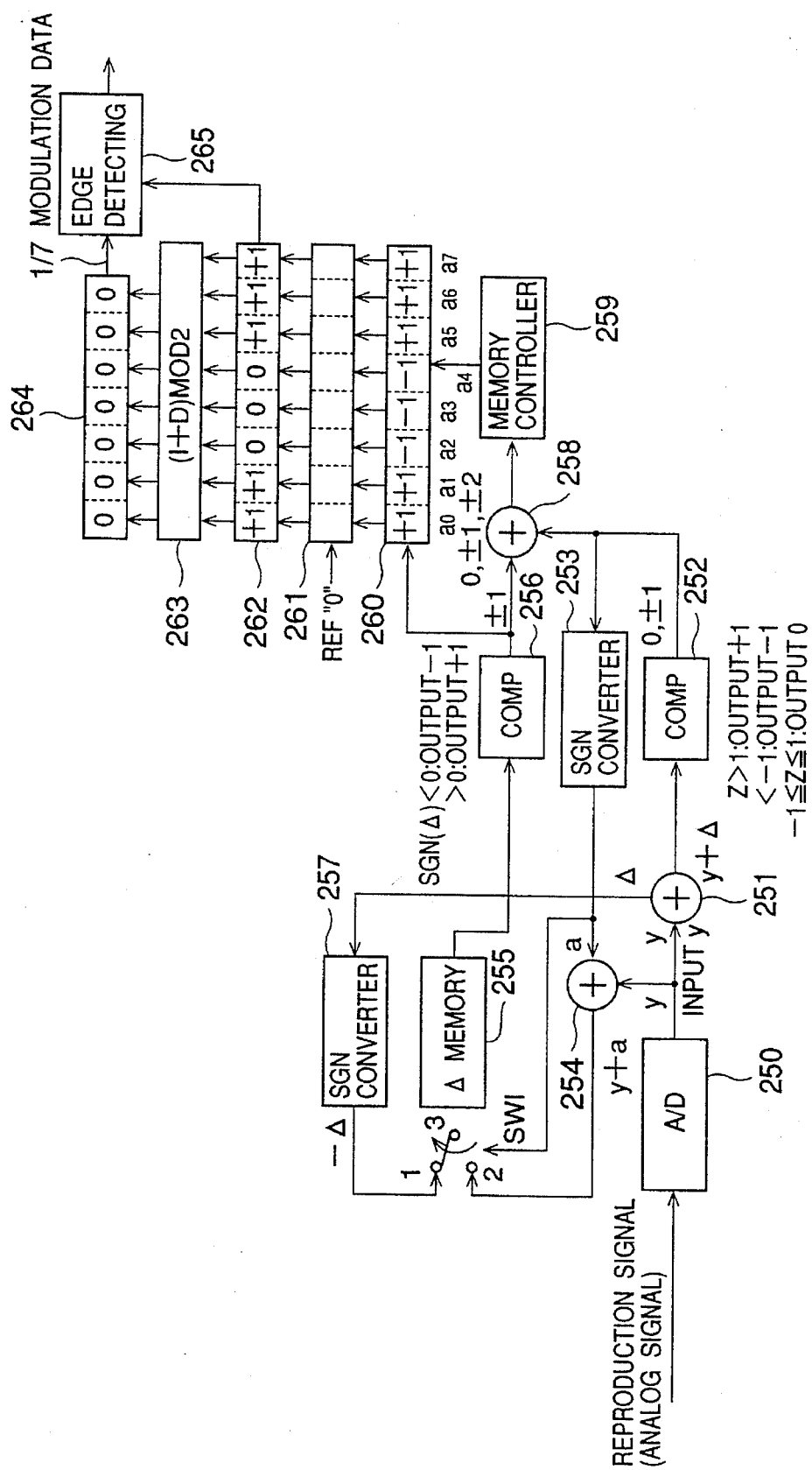
FIG. 4 is a block diagram illustrating a maximum likelihood data detecting circuit.

Each of the first and second maximum likelihood data detecting circuits 25a and 25b is formed, for example, as shown in FIG. 4.

Referring to FIG. 4, each maximum likelihood data detecting circuit has an analog-to-digital converter (an A/D converter) 250, a first adder 251, a first comparator 252, a first sign inverter 253, a second adder 254, a reference value memory (Δ memory) 255, a second comparator 256, a second sign inverter 257, a switch circuit SW1 and a third adder 258. Each maximum likelihood data detecting circuit also has a memory controller 259, a data memory 260, a comparator 261, a register 262, a $(1+D)_{mod2}$ converter 263, an output register 264 and an edge detecting circuit 265.

The A/D converter 250 converts the reproduction signal (an analog signal) into a digital signal in synchronism with the synchronizing clock (the leading edge synchronizing clock or the trailing edge synchronizing clock). The first adder 251 adds input data y (corresponding to the reproduction signal including noises) from the A/D converter 250 and a reference value δ, and outputs an adding value Z (=y+δ). The first comparator 252 determines whether the adding value Z falls within a range of Z>1, Z<−1, or −1≦Z≦1. When the adding value Z falls within the rage of Z>1, the first comparator 252 outputs "+1". When the adding value Z falls within the range of Z<−1, the first comparator 252 outputs "−1". Further, when the adding value Z falls within the range of −1≦Z≦1, the first comparator 252 outputs "0". The first sign inverter 253 inverts the sign of the output value from the first comparator 252 and outputs dada a. That is, when the output value from the first comparator 252 is equal to "+1" the first sign inverter 253 outputs the data a "−1" (a=−1), and when the output value from the first comparator 252 is equal to "−1", the first sing inverter 253 outputs the data a "+1" (a=+1). In addition, when the output value from the first comparator 252 is equal to "0", the first sign inverter 253 outputs the data a "0" (a=0). The second adder 254 adds the input data y from the A/D converter 250 and the above data a and outputs an adding value (y+a). The switch circuit SW1 has a terminal (1) connected to the second sign inverter 257 and a terminal (2) connected to the second adder 254. The switch circuit SW1 selects either terminal (1) or (2) in accordance with the data a. When the data a is not equal to "0" (a=+1 or a =−1), the switch circuit SW1 selects the terminal (2). In this case, the adding value (y+a) from the second adder 254 is supplied to the reference value memory 255 via the switching circuit SW1, so that the adding value (y+a) is stored, as the reference value δ, in the reference value memory 255 (δ=y+a). On the other hand, when the data a is equal to "0", the switching circuit SW1 selects the terminal (1). In this case, an output value −δ from the second sign inverter 257 which inverts the sign of the reference value δ from the reference value memory 255 is supplied to the reference value memory 255 via the switching circuit SW1, so that the output value −δ is stored as a new reference value in the reference value memory 255 (δ=−δ). The second comparator 256 determines whether the sign SGN(Δ) of the reference value δ supplied from the Δ memory 255 is positive or negative. When the sign SGN(Δ) of the reference value δ is positive, the second comparator 256 outputs a determination signal of "1". When the sign SGN(Δ) of the reference value δ is negative, the second comparator 256 outputs the determination signal of "−1". The third adder 258 adds the determination signal (0 or ±1) from the first comparator 252 and the determination signal (+1 or −1) and supplies the adding value (0, ±1 or ±2) to the memory controller 259.

The determination signal (+1 or −1) from the second comparator 256 is written in the data memory 260. The memory controller 259 receives the adding value (0, ±1 or ±2) from the third adder 258 as a control signal, and controls the data memory 260 in accordance with the algorithm indicated in Table-1.

TABLE 1

| MERGE | 1st COMP. (252) | 2nd COMP. (256) | CONTROL SIGNAL | CONTROL OPERATION |
|---|---|---|---|---|
| + merge | +1 | +1 | +2 | 0 → P |
|  |  | −1 | 0 | COMPLEMENT OF MEMORY VALUE 0 → P |
| no merge | 0 | +1 | +1 | SHIFT DATA & |

TABLE 1-continued

| MERGE | 1st COMP. (252) | 2nd COMP. (256) | CONTROL SIGNAL | CONTROL OPERATION |
|---|---|---|---|---|
| – merge | –1 | –1 | –1 | POINTER BY ONE |
|  |  | +1 | 0 | COMPLEMENT OF MEMORY VALUE $0 \to P$ |
|  |  | –1 | –2 | $0 \to P$ |

P: Pointer

The data (+1 or –1) written in the data memory 260 is compared with a reference value "0" by the comparator 261, so that values "+1" and "–1" are respectively converted into "1" and "0". The binary data (0 or 1) obtained by the comparator 261 is set in the register 262. The data set in the register 262 is supplied to the $(1+D)_{mod2}$ converter 263. The $(1+D)_{mod2}$ converter 263 applies the $(1+D)_{mod2}$ conversion to the input data, so that the original 1/7 modulation data is obtained. The 1/7 modulation data is set in the output register 264. The 1/7 modulation data set in the output register 264 is supplied to the edge detecting circuit 265. The edge detecting circuit 265 detects a bit "1" corresponding to the edge of the reproduction signal in the 1/7 modulation data based on the data set in the register 262. That is, the edge detecting circuit 265 in the first maximum likelihood data detecting circuit 25a outputs, as the leading edge data signal, bits "1" corresponding to the leading edges of the reproduction signal, in synchronism with the leading synchronizing clock (5). The edge detecting circuit 256 in the second maximum likelihood data detecting circuit 25b outputs, as the trailing edge data signal, bits "1" corresponding to the trailing edges of the reproduction signal, in synchronism with the trailing edge synchronizing clock (6).

Figure 5:
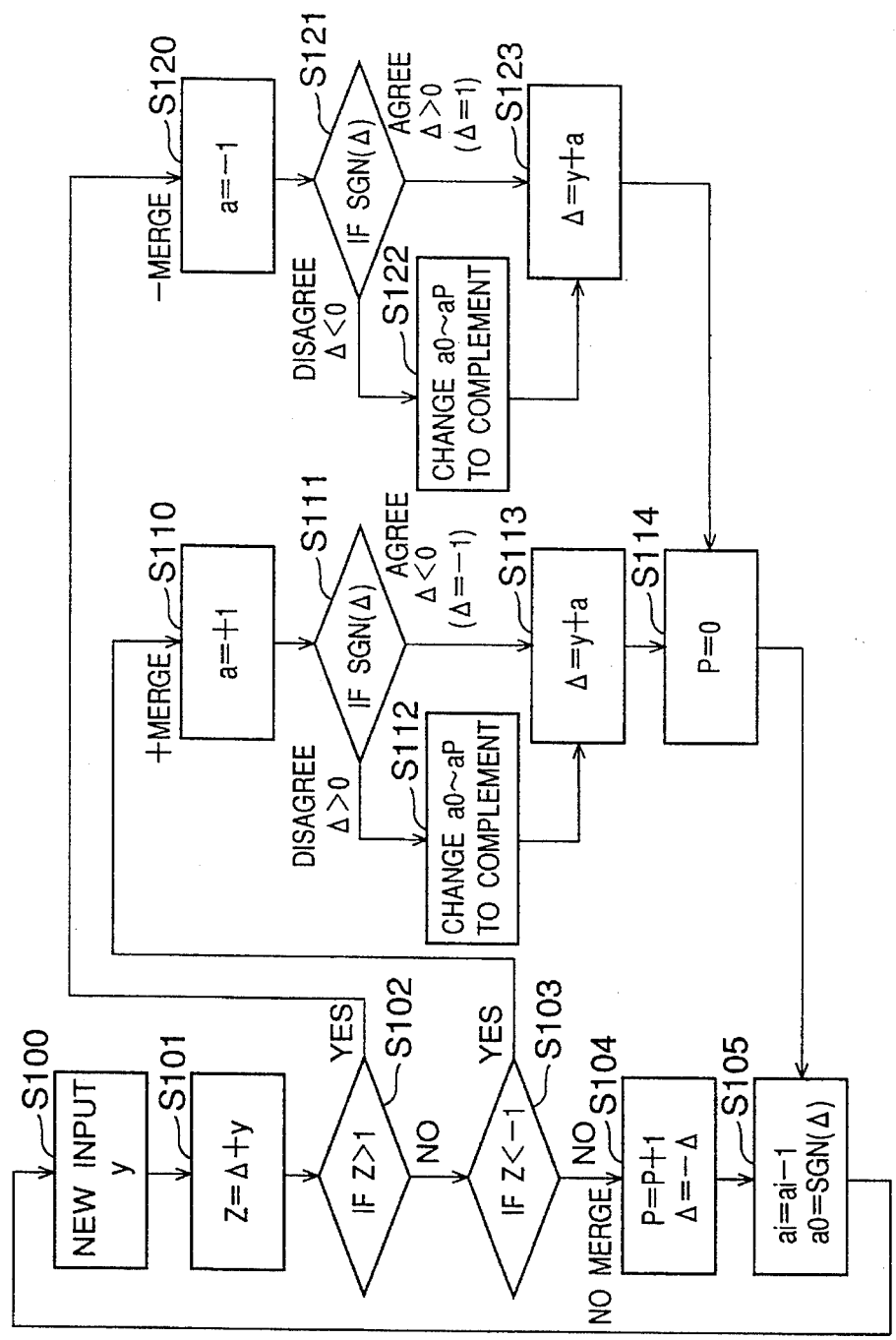
FIG. 5 is a flow chart illustrating an operation of the maximum likelihood data detecting circuit.

The respective maximum likelihood data detecting circuits 25a and 25b having the above structure operate in accordance with a flow chart shown in FIG. 5. A description will now be given, with reference to FIG. 6B (10)–(18), of the operation of the respective maximum likelihood data detecting circuits 25a and 25b.

Figure 6B:
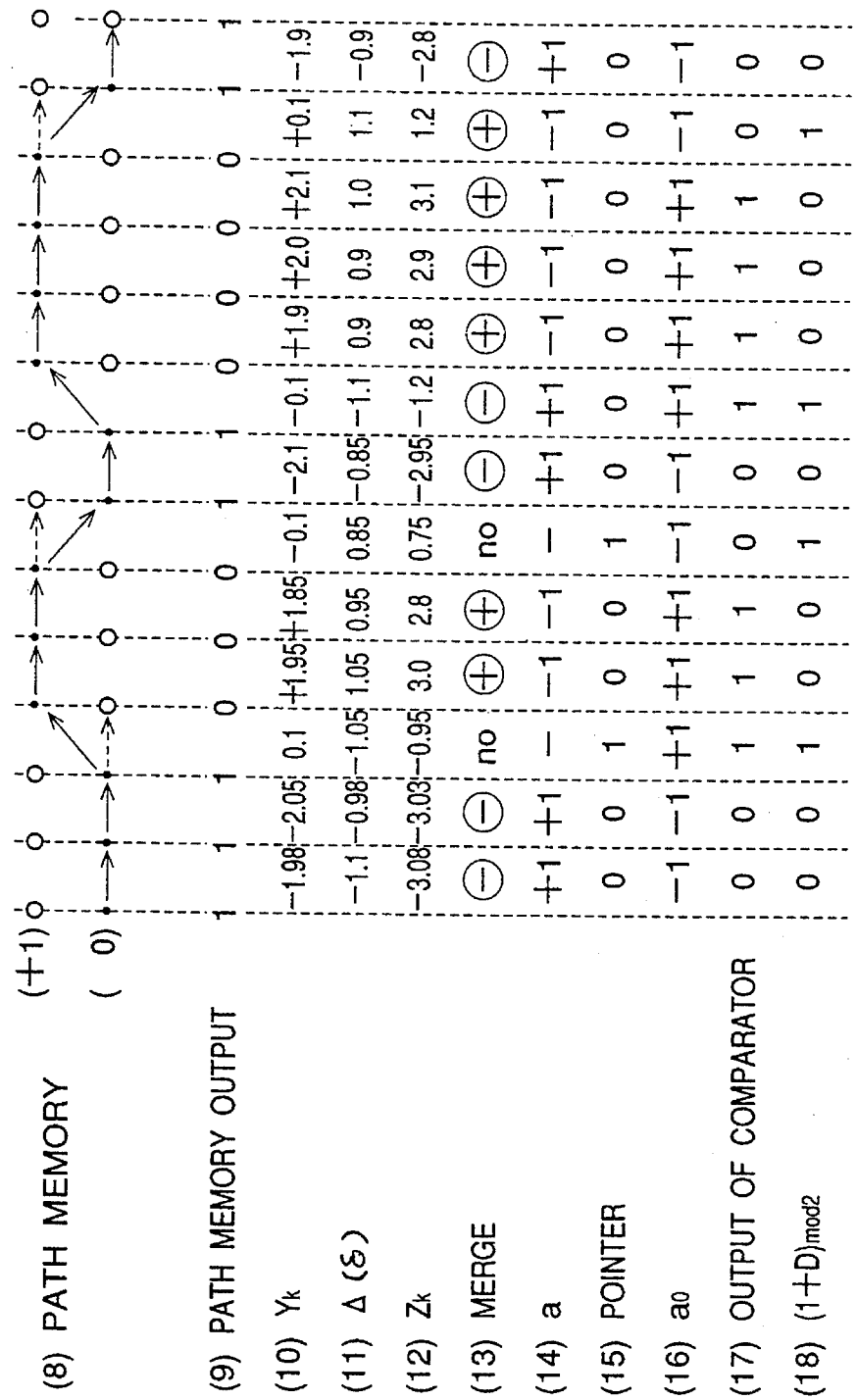
FIG. 6B is a timing chart illustrating signal processing in the reproducing system.

The input data yk from the A/D converter 250 is changed, for example, as follows (see FIG. 6B (10)).

| k | yk | k | yk |
|---|---|---|---|
| 1 | –1.98 | 8 | –0.1 |
| 2 | –2.05 | 9 | +1.9 |
| 3 | 0.1 | 10 | +2.0 |
| 4 | +1.95 | 11 | +2.1 |
| 5 | +1.85 | 12 | +0.1 |
| 6 | –0.1 | 13 | –1.9 |
| 7 | –2.1 |  |  |

The input data yk is each sampling value of the reproduction data shown in FIG. 6A (6) and includes noise components.

For example, at a timing k=2, when the input data yk=–2.05 is output from the A/D converter 250 (step S100 shown in FIG. 4), the first adder 251 adds the reference value δ=–0.98 which has been obtained at a previous timing k=1 and the input data yk=–2.05, so that the adding value Z=–3.03 is output from the first adder 251 (step S101). In this case, since the adding value Z is less than "–1", it is determined that the state of the data transition is the "–merge" (steps S102 and S103), and the first comparator 252 outputs the determination result of "–1". As a result, the data a of "+1" is supplied from the sign inverter 253 to the second adder 254 (step S110). In addition, since the reference value δ (=–0.98) is negative, the second comparator 256 outputs the determination result of "–1", (step S111). Based on the above data a of "+1" the switching circuit SW1 selects the terminal (2), so that the adding value (y+a=–2.05+1=–1.05) obtained by the second adder 254 is stored in the reference value memory 255 (S113). The memory controller 259 then receives the control signal of "–2" from the third adder 258 and resets the pointer P of the data memory 260 to "0" (S114)(see Table-1). Data in the data memory 26 is shifted (ai→ai–1) and the determination result of "–1" (SGN(Δ)) output from the second comparator 256 is written at a bit a0 (corresponding to P=0) of the data memory 60 (step S105).

Next, at a timing k=3, when the input data yk=0.1 is output from the A/D converter 250, the first adder 251 adds the input data yk=0.1 and the reference value δ=–1.05 from the reference value memory 255 which reference value has been obtained at the previous timing k=2 and outputs the adding value Z=–0.95 (=–1.05+0.1) (step S101). Since the adding value falls within the rage of –1≦Z≦+1, it is determined that the state of the data transition is the "no merge" (steps S103 and S104), and the first comparator 252 outputs the determination result of "0". As a result, the data a of "0" is output from the sing inverter 253, and based on this data a of "0", the switching circuit SW1 is switched from the terminal (2) to the terminal (1). At this time, the second comparator 256 outputs the determination result of "–1" (SGN(Δ)) based on the reference value δ=–1.05 in the reference value memory 255. Thus, the memory controller 259 receives the control signal of "–1" from the third adder 258, so that the pointer P of the data memory 260 is incremented by one (P+1) (step S104) (see Table-1). The sign of the reference value δ=–1.05 stored in the reference value memory 255 is inverted by the second sign inverter 257, so that a new reference value δ=1.05 is stored in the reference value memory 255 (step S104). The new reference value δ=1.05 is supplied from the reference value memory 155 to the second comparator 256, and the second comparator 256 outputs the determination result of "+1". After this, the data in the data memory 260 is shifted (ai→ai–1), and the determination result of "+1" (SGN(Δ)) output from the second comparator 256 is written at the bit a0 of the data memory 260 (step S105).

Furthermore, at a timing k=4, when the input data yk=+1.95 is output from the A/D converter 250 (step S100), the first adder 251 adds the input data yk=1.95 and the reference value δ=1.05 from the reference value memory 255 which reference value δ has been obtained at the previous timing k=3, and outputs the adding value Z=3.0 (=1.05+1.95) (step S101).

In this case, since the adding value Z is greater than "+1", it is determined that the state of the data transition is "+merge" (step S102), and the first comparator 252 outputs the determination result of "+1". As a result, the data a of "–1" is supplied from the sign inverter 253 to the second adder 254 (step S120). In addition, since the reference value δ (=1.05) is positive, the second comparator 256 outputs the determination result of "−1" (SGN(Δ)) (step S12). Based on the data a of "−1", the switching circuit SW1 is switched from the terminal (1) to the terminal (2), so that the adding value (y+a=+1.95−1=0.95) obtained by the second adder 254 is stored in the reference value memory 255 (step S123). The memory controller 259 then receives the control signal of "+2" from the third adder 258, so that the pointer P (=1) of the data memory 260 is reset to "0" (step S114) (see Table-1). After this, the data in the data memory 260 is shifted (ai→ai−1), and the determination result of "+1"(SGN(Δ)) output from the second comparator 256 is written at the bit a0 (corresponding to P=0) of the data memory 260 (step S105).

The above process is repeated. While the process is being repeated, the contents of the data memory 260 is decided every time the pointer P is reset to "0". As has been described above, in a case where the state of the data transition is the "no merge", the pointer P is incremented by one and "+1" or "−1" corresponding to the sign of the reference value δ is written in the data memory 260. After this, when the state of the data transition is changed to the "+merge" and the reference value δ is positive, or when the state of the data transition is changed to the "−merge" and the reference value δ is negative, data which has been stored in the data memory 260 under a condition of the "no merge" and data subsequently stored in the data memory 260 under a condition of the "+merge" or the "−merge" are decided. On the other hand, when an unacceptable case (disagree) occurs, such as a case where the reference value δ is negative in the "+merge" after the "no merge" or a case where the reference value δ is positive in the "−merge" after the "no merge", complements of the data bits a0–ap (p is a value of the pointer P) which have been stored in the data memory in the "no merge" are calculated (step S113 or step S123). The data bits a0–ap in the data memory 260 are changed to the complements thereof. After this, the pointer P is reset to "0" and the contents of the data memory 260 are decided.

The above process is based on a concept in which the data transition path has not yet been decided in the "no merge". That is, the data transition path in the "no merge" is decided as 0→1 or 1→0 in accordance with the state change from the "no merge" to "+merge" or from the "no merge" to the "−merge".

As has been described above, the data memory 260 is provided with the data of "+1" or "−1". The data (+1 or −1) is compared with "0" by the comparator 261, so that the data (+1 or −1) is converted into "1" or "0". The output data of the comparator 261 is stored in the register 262 (see FIG. 6B (17)). The bit sequence stored in the register 262 corresponds to the data transition path shown in FIG. 6A (8). After this, the $(1+D)_{mod2}$ converter 263 converts the data in the register 262 in accordance with the $(1+D)_{mod2}$ algorithm, and the converted data is stored in the output register 264 (see FIG. 6B (18)). The data obtained by the $(1+D)_{mod2}$ converting operation corresponds to the original 1/7 modulation data (see FIG. 6A (2)).

Figure 7:
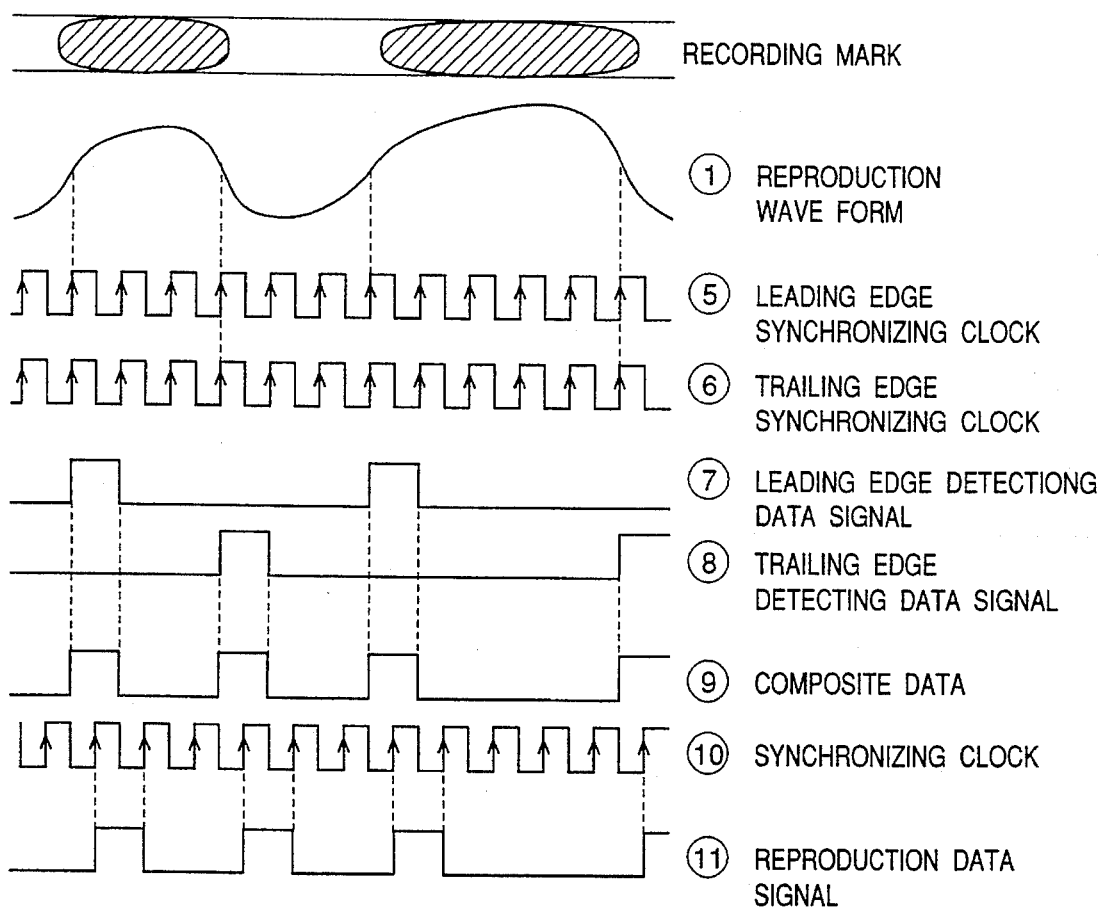
FIG. 7 is a timing chart illustrating generation of reproduction data.

In the data reproducing system as has been described above, as shown in FIG. 7, the first maximum likelihood data detecting circuit 25a outputs, in synchronism with the leading edge synchronizing clock (5), the leading edge data signal (7) corresponding to the leading edges of the reproduction signal. The second maximum likelihood data detecting circuit 25b outputs, in synchronism with the trailing edge synchronizing clock (6), the trailing edge data signal (8) corresponding to the trailing edges of the reproduction signal. The composite data (9) output from the OR circuit 26 is discriminated in synchronism with the synchronizing clock (10), and the reproduction data signal (11) corresponding to the 1/7 modulation data is obtained.

In the above embodiment, even if the size (the length in a peripheral direction of a track) of each recording mark is varied in accordance with various conditions in the data recording process, the distance between leading edges of recording marks adjacent to each other are approximately constant and also the distance between trailing edges of recording marks adjacent to each other are approximately constant. Thus, even if the size of the each recording mark is varied, the leading edge synchronizing clock (5) synchronized with the leading edges of the reproduction signal having a waveform corresponding to the arrangement of the recording marks and the trailing edge synchronizing clock (6) synchronized with the trailing edges of the reproduction signal are respectively maintained in a stable state. The leading edge synchronizing clock (5) and the trailing edge synchronizing clock (6) are made based on the reproduction signal waveform (1). Thus, even if the reproduction signal waveform (1) is varied by the variation of the size of each recording mark, the relative phase relationship between the reproduction signal waveform (1) and the respective synchronizing clocks (5) and (6) is not varied. As a result, the leading edge reproduction data signal (7) is accurately synchronized with the leading edges of the recording marks, and the trailing edge reproduction data signal (8) is accurately synchronized with the trailing edges of the recording marks. That is, the reproduction data signal (the 1/7 modulation data) obtained by the composition of the leading edge reproduction data signal (7) and the trailing edge reproduction data signal (8) accurately corresponds to the reproduction signal waveform (1).

The synchronizing clock (10) used in the data discrimination circuit 27 may be a clock obtained by inversion of a clock synchronized with center points of phase differences between the clocks (5) and (6).

Figure 8:
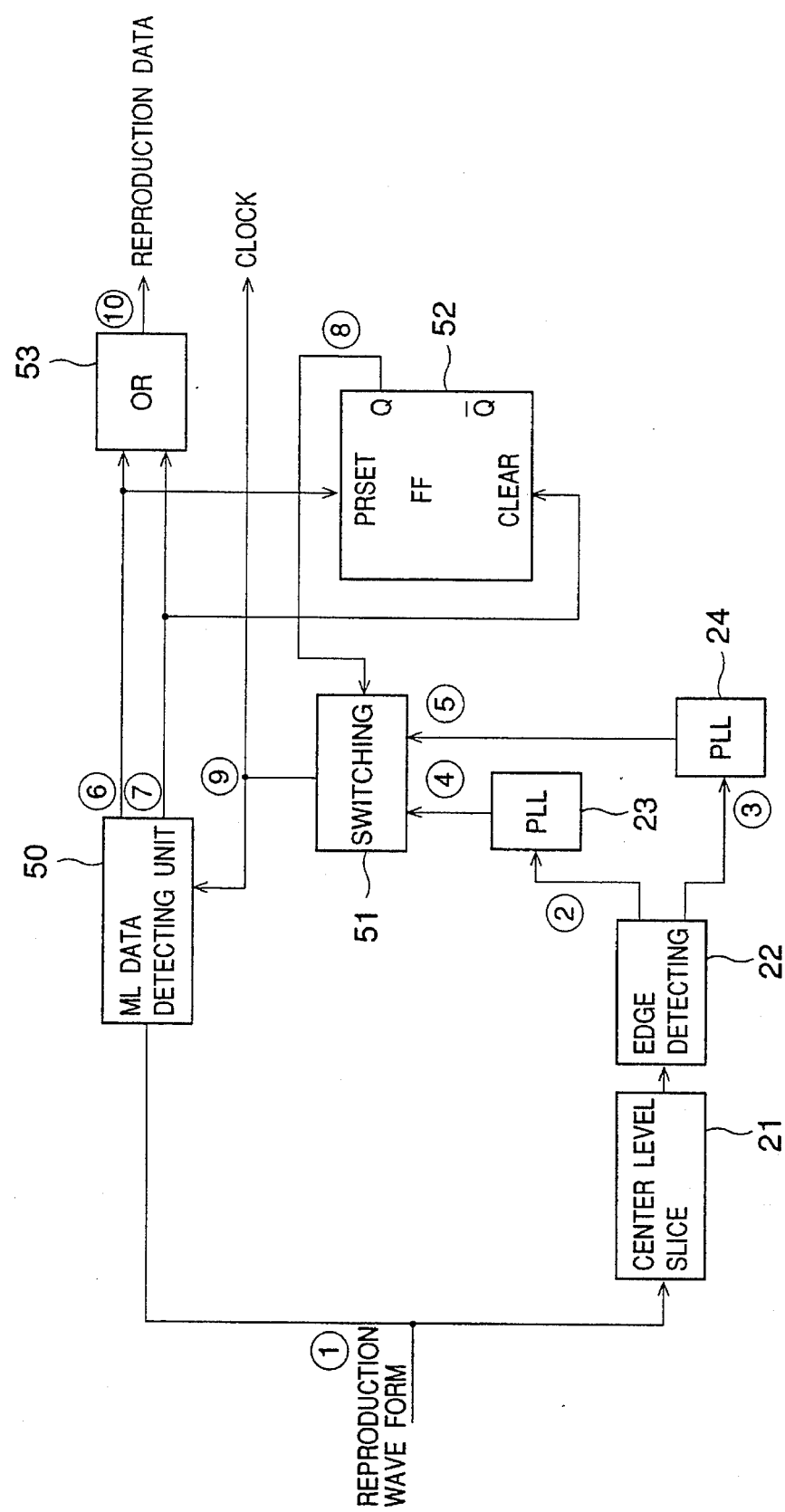
FIG. 8 is a block diagram illustrating a data reproducing system according to another embodiment of the present invention.

FIG. 8 shows another structure of the data reproducing system. Referring to FIG. 8, there are provided the center level binarizing circuit 21, the edge detecting circuit 22, the first PLL circuit 23 and the second PLL circuit 24 in the same manner as that shown in FIG. 2. The leading edge synchronizing clock (4) synchronized with the leading edge data signal (2) corresponding to the leading edges of the binary signal output from the center level binarizing circuit 21 and the trailing edge synchronizing clock (5) synchronized with the trailing edge data signal (3) corresponding to the trailing edges of the binary signal are respectively output from the first PLL circuit 21 and the second PLL circuit 24.

This data reproducing system also has a maximum likelihood data detecting circuit 50, a clock switching circuit 51, a flip-flop circuit 52 and an OR circuit 53. The clock switching circuit 51 selects either the leading edge synchronizing signal (4) or the trailing edge synchronizing signal (5) in accordance with the state of an output signal Q (a switching signal) from the flip-flop circuit 52 so as to output a composite clock (9). The maximum likelihood data detecting circuit 50 operates in synchronism with the composite clock (9) from the clock switching circuit 51, and detects leading edge data (6) corresponding to the leading edges of the reproduction signal waveform (1) and trailing edge data (7) corresponding to the trailing edges of the reproduction signal waveform (1) in accordance with the maximum likelihood sequence estimation process. The flip-flop circuit 52 is preset by the leading edge data (6) from the maximum likelihood data detecting circuit 50 (Q has a high level), and after this, the flip-flop circuit 52 is cleared by the trailing edge data (7) (Q has a low level). Thus, the output signal Q (the switching signal) from the flip-flop circuit 52 is in a state where it is set at the high level from output of the leading edge data (6) to output of the trailing edge data (7), and is in a state where it is cleared to the low level from output of the trailing edge data (7) to output of the leading edge data (6). When the output signal Q (the switching signal) from the flip-flop circuit 52 is in the state where it is set at the high level, the clock switching circuit 51 selects the trailing edge synchronizing clock (5). When the output signal Q (the switching signal) is in the state where it is cleared to the low level, the clock switching circuit 51 selects the leading edge synchronizing clock (4). That is, immediately after the leading edge data (6) is output from the maximum likelihood data detecting circuit 50, the leading edge synchronizing clock (4) is switched to the trailing edge synchronizing clock (5). Alternatively, immediately after the trailing edge data (7) is output from the maximum likelihood data detecting circuit 50, the trailing edge synchronizing clock (5) is switched to the leading edge synchronizing clock (4).

Figure 9:
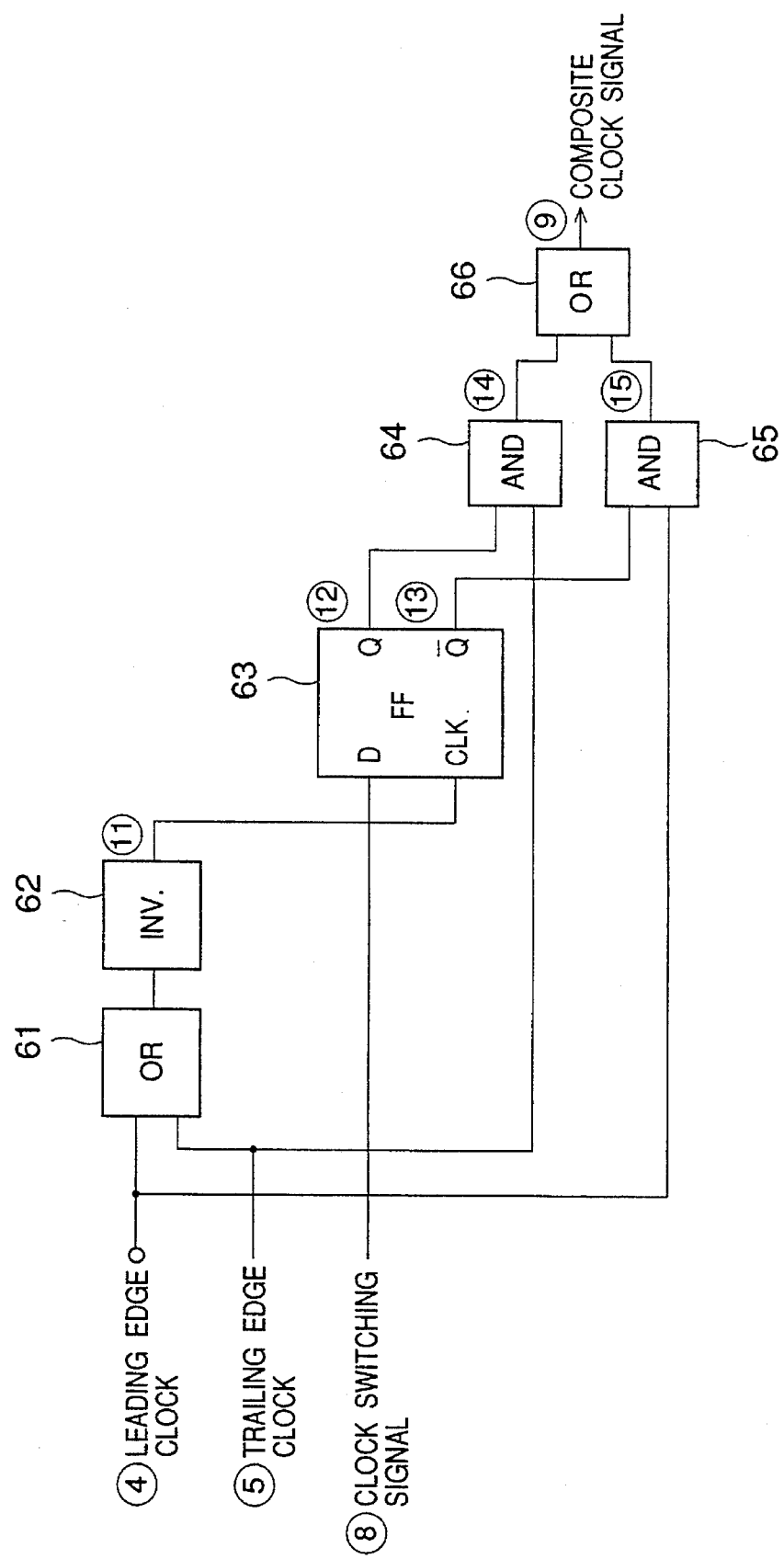
FIG. 9 is a block diagram illustrating a structure of a switching circuit shown in FIG. 8.

The clock switching circuit 51 performing the above switching operation is formed, for example, as shown in FIG. 9.

Referring to FIG. 9, the clock switching circuit 51 has an OR circuit 61, an inverter 62, a D-type flip-flop circuit 63, AND circuits 64 and 65 and an OR circuit 66. The leading edge synchronizing clock (4) and the trailing edge synchronizing clock (5) are input to the OR circuit 61. An output signal of the OR circuit 61 is supplied to the inverter 62. Thus, the inverter 62 outputs a pulse signal (11) corresponding to the phase difference between the leading edge synchronizing clock (4) and the trailing edge synchronizing clock (5). The pulse signal (11) from the inverter 62 is supplied to a clock terminal (CLK) of the D-type flip-flop circuit 63, and the switching signal (8) from the flip-flop circuit 52 described above is supplied to a data input terminal (D) of the D-type flip-flop circuit 63. An output signal Q (12) of the D-type flip-flop circuit 63 and the trailing edge synchronizing clock (5) are input to the AND circuit 64, and an inverting output signal $\overline{Q}$ (13) of the D-type flip-flop circuit 63 and the leading edge synchronizing clock (4) are input to the AND circuit 65. Output signals (14) and (15) from the respective AND circuits 64 and 65 are input to the OR circuit 66, and the composite clock (9) is output from the OR circuit 66.

Figure 10:
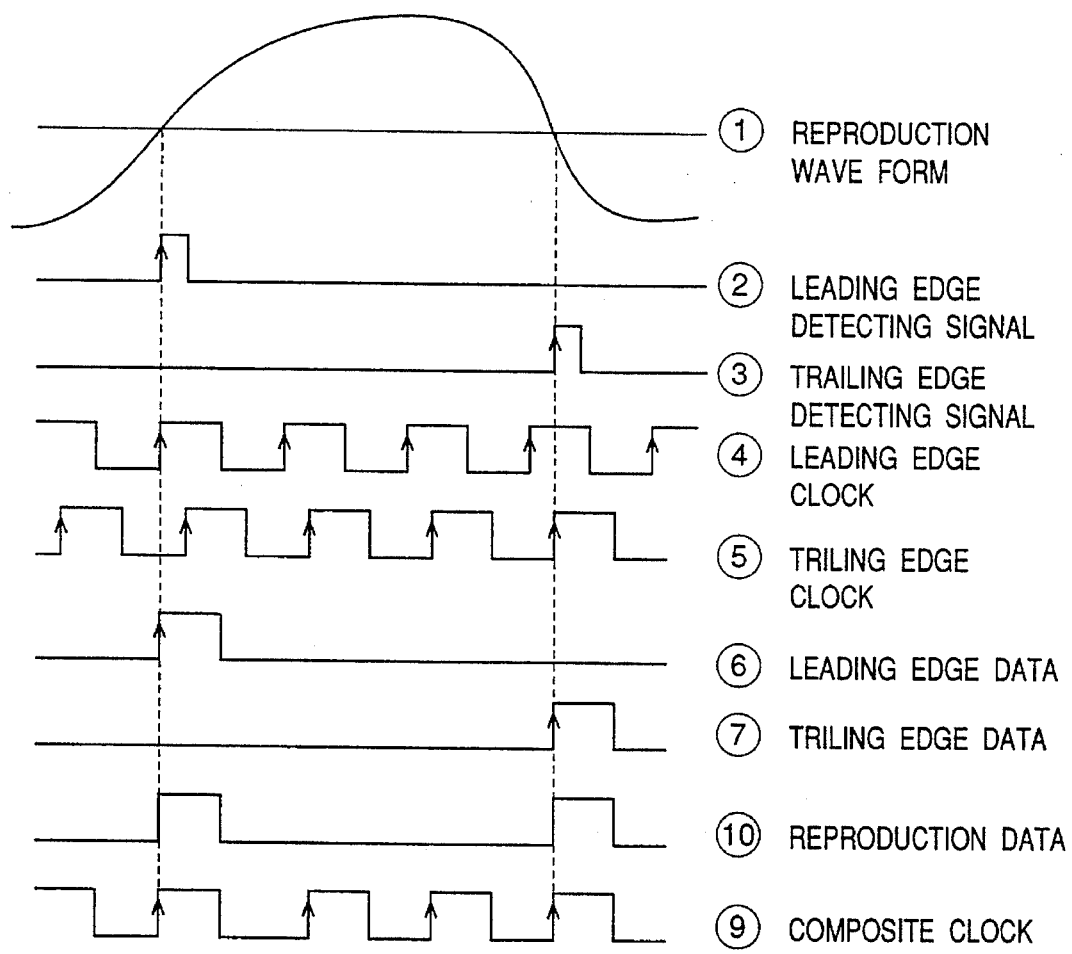
FIG. 10 is a timing chart illustrating generation of reproduction data.
Figure 11:
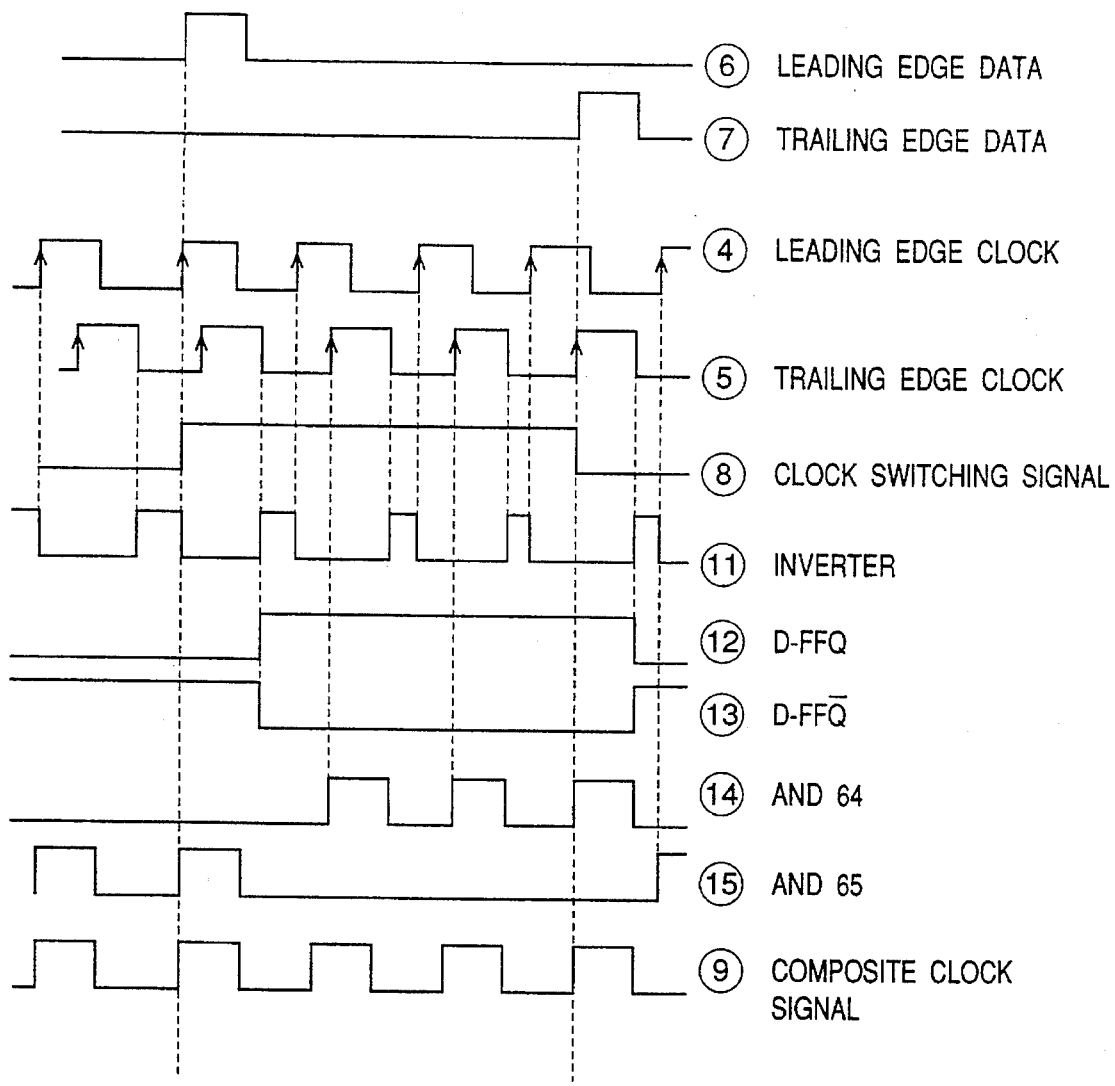
FIG. 11 is a timing chart illustrating generation of a composite clock signal.

The states of the respective signals (1) to (15) are shown in FIG. 10 and FIG. 11.

In the clock switching circuit 51, as has been described above, the switching signal (8) (the output signal of the flip-flop circuit 52) is delayed by the D-type flip-flop circuit 63 operating in synchronism with the pulse signal (11) from the inverter 62, so the signal Q is obtained. The signal Q is input to the AND circuit 64, and the inverting signal $\overline{Q}$ thereof is input to the AND circuit 65. As a result, when the switching signal (8) has the high level, the leading edge synchronizing clock (4) is masked by the AND circuit 65 and the trailing edge synchronizing clock (5) passes through the AND circuit 64 and the OR circuit 66 and is output as the composite clock (9). On the other hand, when the switching signal (8) has the low level, the trailing edge synchronizing clock (5) is masked by the AND circuit 64 and the leading edge synchronizing clock (4) passes through the AND circuit 65 and the OR circuit and is output as the composite clock (9).

The leading edge data (6) and the trailing edge data (7) output from the maximum likelihood data detecting circuit 50 operating in synchronism with the composite clock (9) obtained as described above are composed by the OR circuit 53, so that the reproduction data (10) is obtained.

Figure 12:
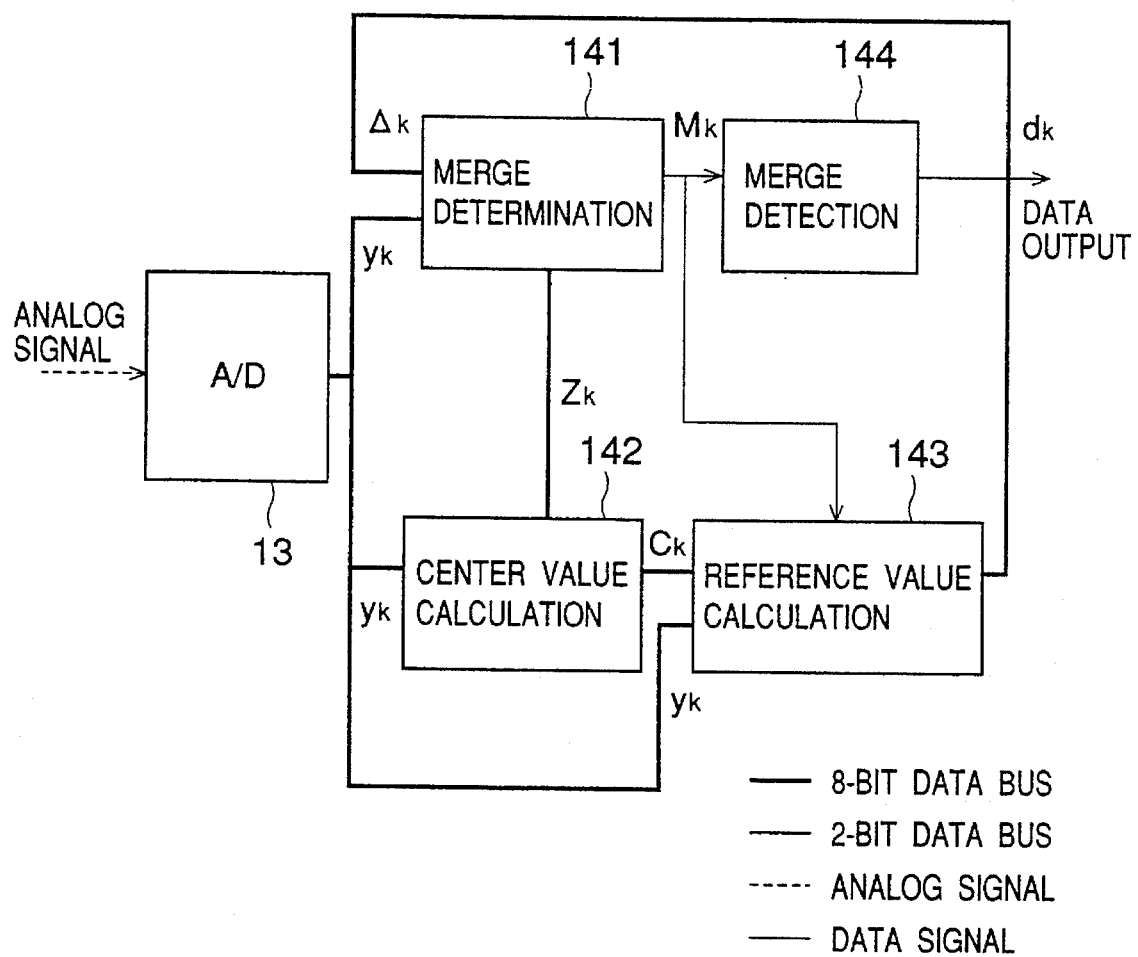
FIG. 12 is a block diagram illustrating another structure of the maximum likelihood sequence estimation unit.

The maximum likelihood data detecting circuit 50 may be formed as shown in FIG. 12.

Referring to FIG. 12, the maximum likelihood data detecting circuit 50 has an analog-to-digital converter (an A/D converter) 13, a merge determination unit 141, a center value calculation unit 142, a reference value calculation unit 143 and a merge detecting unit 144. The reproduction signal (1) which is an analog signal is converted into digital data by the A/D converter 13 in synchronism with the composite clock (9). The merge determination unit 141 performs a merge determination process for input data yk by using the input data yk from the A/D converter 13 and a reference value δk from the reference value calculation unit 143 and outputs a determination value Mk.

Figure 13:
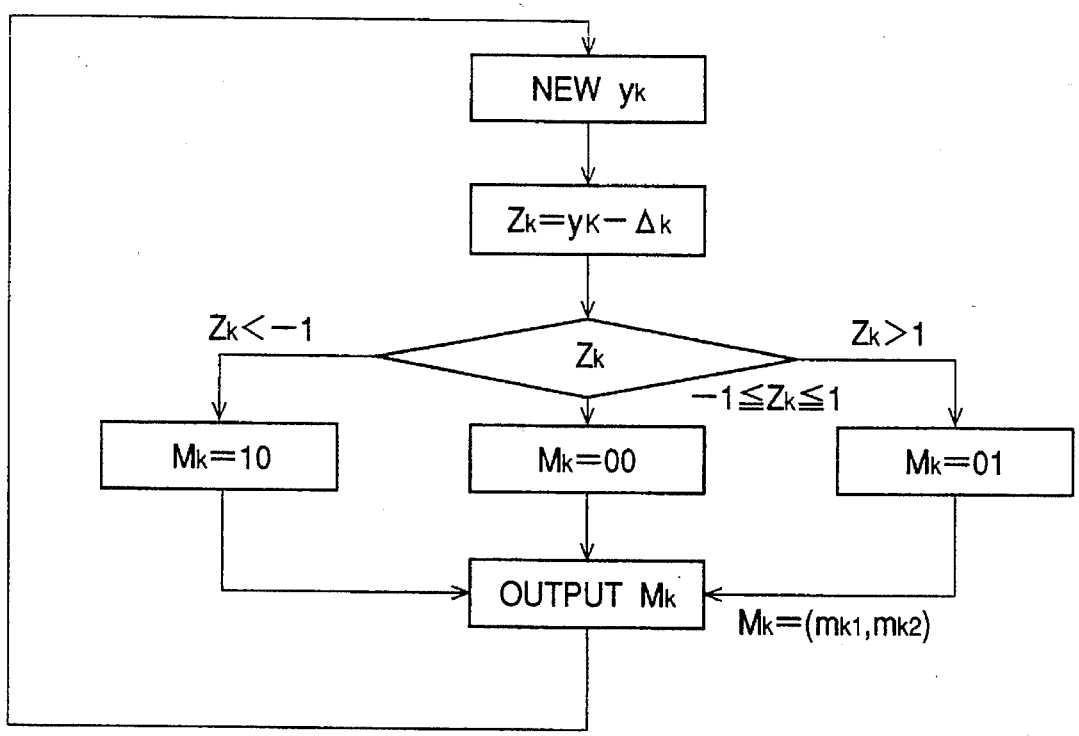
FIG. 13 is a flow chart illustrating a process in a merge determination unit shown in FIG. 12.
Figure 17:
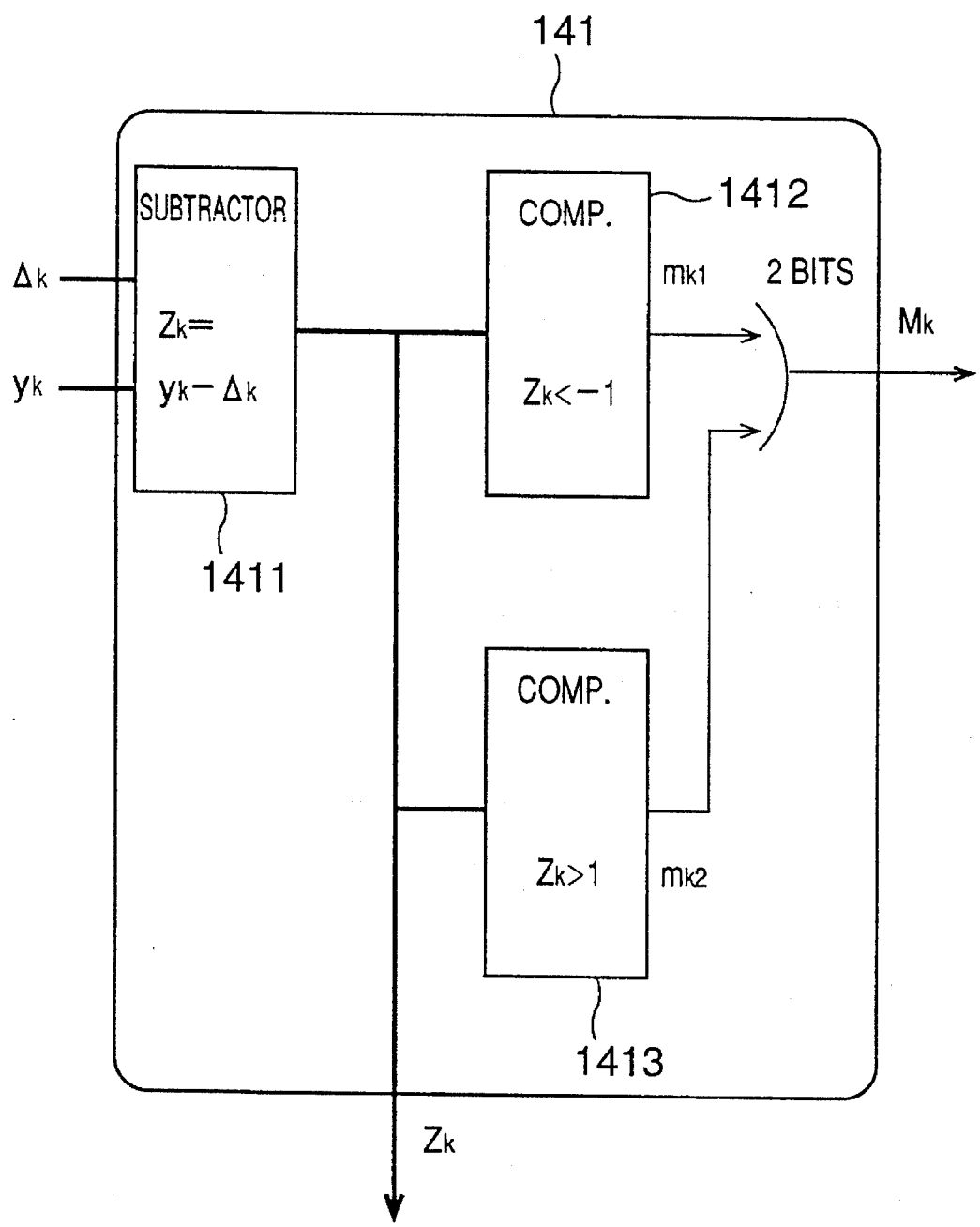
FIG. 17 is a block diagram illustrating a structure of the merge determination unit.

The merge determination unit performs the merge determination process in accordance with a flow chart shown in FIG. 13. That is, Zk (=yk−δk) is calculated by using new input data yk and the reference value δk. Based on the Zk, it is determined whether the present state is the "+merge", the "−merge" or the "no merge". In a case of the "+merge" (Zk>1), the determination value Mk=(mk1, mk2)=(01) is output. In a case of the "−merge" (Zk<−1), the determination result Mk=(10) is output, and in a case of the "no merge" (−1≦Zk≦1), the determination value Mk=00 is output. The process in the merge determination unit 141 corresponds to steps S100–S103 shown in FIG. 5. To achieve the above merge determination process, the merge determination unit 141 has, for example, a subtracter 1411 (Zk=yk−δk), a first comparator 1412 (Zk<−1) and a second comparator 1413 (Zk>1) as shown in FIG. 17.

Figure 14:
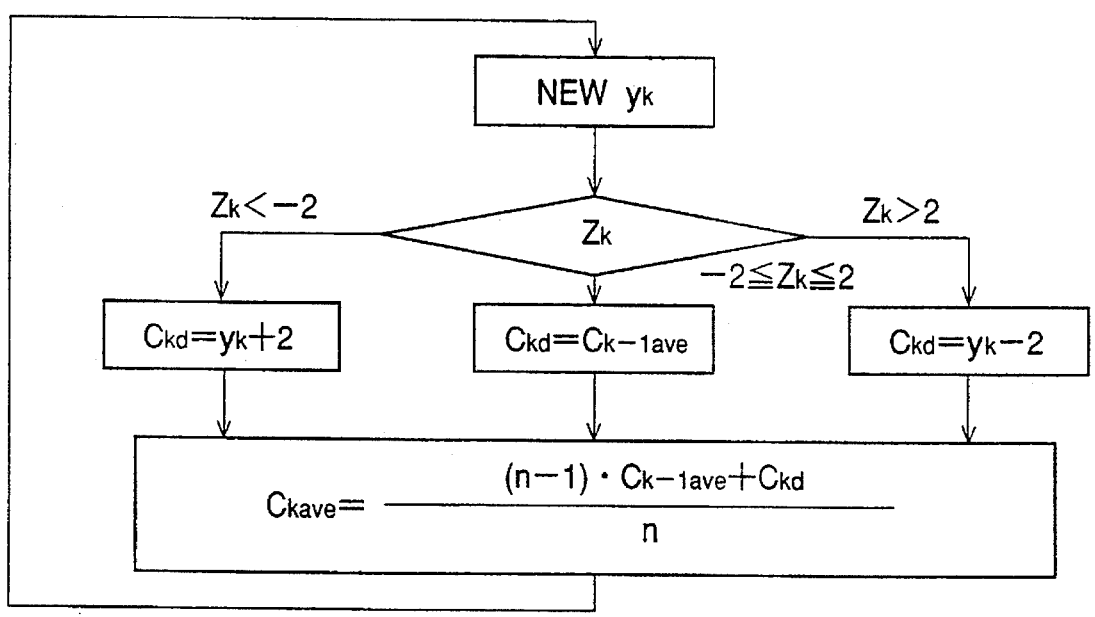
FIG. 14 is a flow chart illustrating a process in a center value calculation unit shown in FIG. 12.

The center value calculation unit 142 performs a process in accordance with a flow chart shown in FIG. 14. That is, when new input data yk is supplied, center value data $C_{kd}$ depending on the Zk obtained in the merge determination unit 141 is calculated. In a case where Zk>2, the center value data $C_{kd}$ is calculated in accordance with the following formula:

$$C_{kd}=y_k-2.$$

In a case where −2≦Zk≦2, the center value data $C_{kd}$ is calculated in accordance with the following formula:

$$C_{kd}=C_{k-1ave}.$$

In a case where Zk<−2, the center value data $C_{kd}$ is calculated in accordance with the following formula:

$$C_{kd}=y_k+2.$$

In the case where Zk>2, the input data yk is firmly in the "+merge". Thus, "2" which is an ideal amplitude value is subtracted from the input data yk, so that the center value data $C_{kd}$ is obtained (see FIG. 6A (6)). In the case where Zk<−2, the input data yk is firmly in the "−merge". Thus, "−2" which is a negative ideal amplitude value is subtracted from the input data yk, so that the center value data $C_{kd}$ is obtained. In the case where −1≦Zk≦2, it cannot be not firmly determined whether the input data yk is in the "+merge" or the "−merge" (including a case of "no merge"). The center value $C_{k-1ave}$ which has been calculated in the previous timing k−1 is used as the present center value data $C_{kd}$ at the timing k. The center value $C_{kave}$ is calculated using the center value data $C_{dk}$ as calculated above and the center value $C_{k-1ave}$ which has been calculated in the previous timing k−1, in accordance with the following formula:

$$C_{kave}=[(n-11)C_{k-1ave}+C_{kd}]/n.$$

The center value $C_{kave}$ as calculated above corresponds to an average value of n center value data items $C_{kd}$. A curve which links center values $C_{kave}$ together represents a center level $C_k$ of the reproduction signal shown in FIG. 21.

Figure 19:
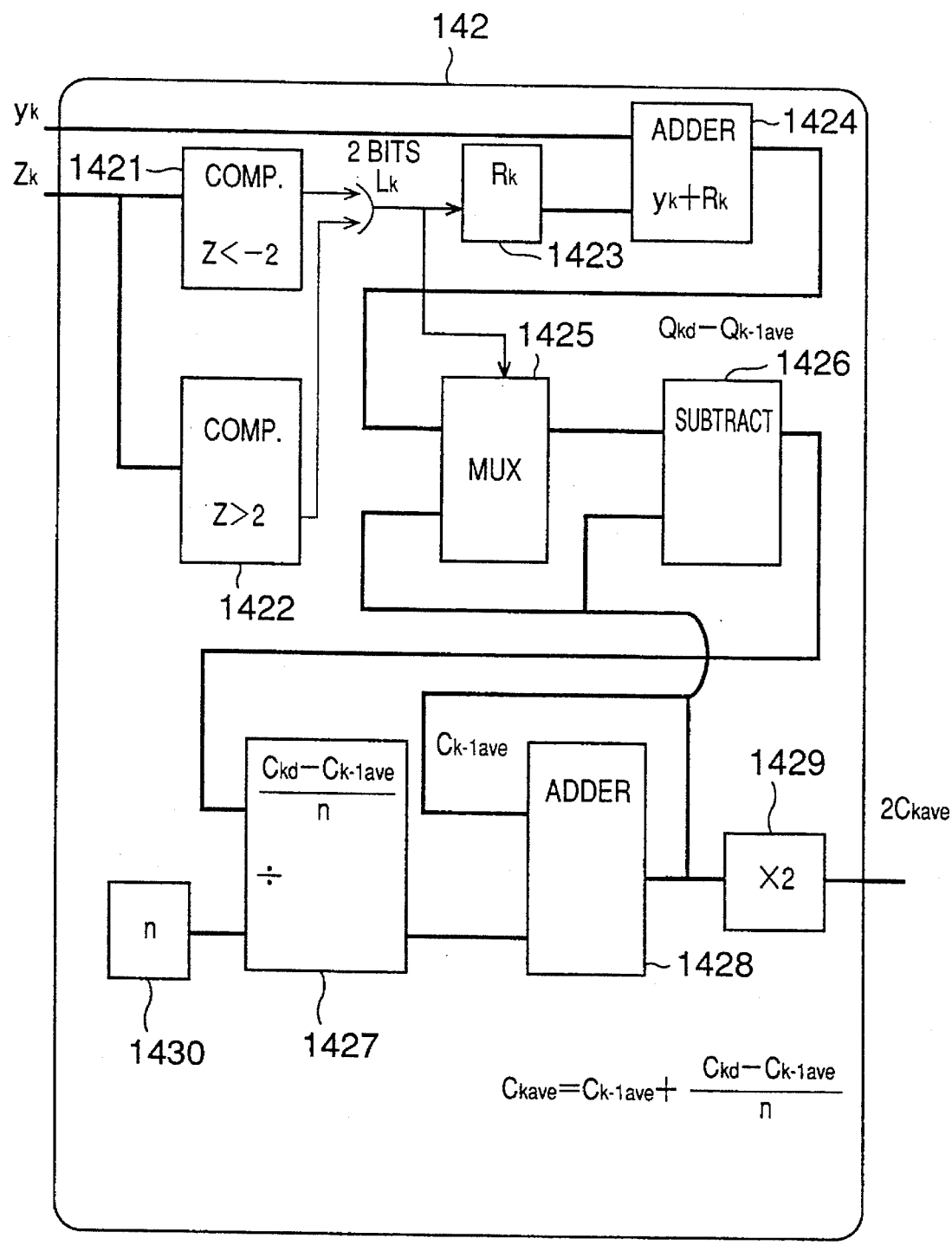
FIG. 19 is a block diagram illustrating a structure of the center value calculation unit.

To achieve the above process, the center value calculation unit 142 is formed, for example, as shown in FIG. 19. Referring to FIG. 19, the center value calculation unit 142 has a first comparator 1421, a second comparator 1422, a constant output circuit 1423, an adder 1424, a multiplexer 1425, subtracter 1426, a divider 1427, an adder 1428, a multiplier 1429 and a register 1430. The first comparator 1421 determines whether or not Zk<−2. The second comparator 142 determines whether or not Zk>2. A count value n is set in the register 1430. The constant output circuit 1423 outputs a constant value Rk (8 bits) in accordance with the determination result 11 obtained by the first comparator 1421 and the determination result 12 obtained by the second comparator 1422. In a case where 11=0 and 12=1, the constant value Rk is equal to "−2", and in a case where 11=1 and 12=0, the constant value Rk is equal to "2". The adder 1424 adds the input data yk and constant value Rk (−2 or 2). The multiplexer 1425 selects, as the center value data $C_{kd}$, either the adding result (yk+Rk) from the adder 1424 or the center value $C_{k-1ave}$ which has been calculated by the adder 1428 at the previous timing k−1, in accordance with the determination result Lk=(11, 12) from the first and second comparators 1421 and 1422. When the determination result Lk=(11, 12) is equal to (0, 0) (corresponding to the "no merge"), the center value $C_{k-1ave}$ which has been calculated at the previous timing k−1 is selected. The subtracter 1426 subtracts the center value $C_{k-1ave}$ which has been previously calculated from the center value data $C_{kd}$ from the multiplexer 1425. The divider 1427 divides the calculation result $C_{kd}-C_{k-1ave}$ from the subtracter 1426 by the count value n set in the register 1430, and outputs a calculating value $([C_{kd}-C_{k-1ave}]/n)$. The adder 1428 adds the calculating value $([C_{kd}-C_{k-1ave}]/n)$ from the divider 1427 and the center value $C_{k-1ave}$ which has been calculated in the previous timing k−1 and the center value $C_{kave}$ $$C_{kave}=C_{k-1ave}+[C_{kd}-C_{k-1ave}]/n$$

is output from the adder 1428 at this timing k. The multiplier 1429 doubles the center value $C_{kave}$ from the adder 1428 and outputs $2C_{kave}$. The doubled center value $2C_{kave}$ is used in the reference value calculation unit 143.

Figure 15:
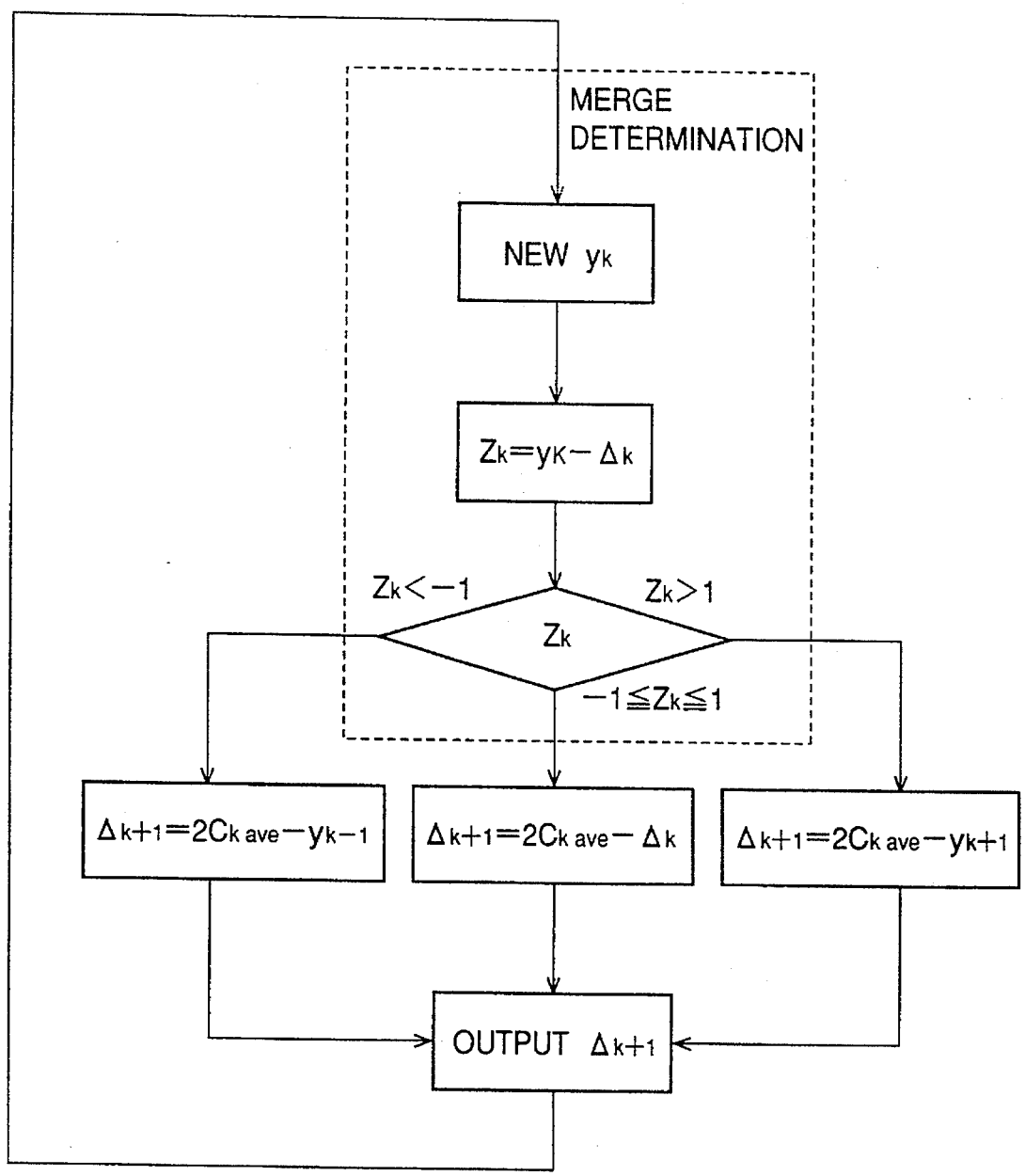
FIG. 15 is a flow chart illustrating a process in a reference value calculation unit shown in FIG. 12.

The reference value calculation unit 143 performs a process in accordance with a flow chart shown in FIG. 15. That is, the reference value calculation unit 143 outputs a reference value $\delta_{k+1}$ depending on the determination value $M_k$ from the merge determination unit 141. In a case where the determination value $M_k$=(01) (Zk>1: "no merge"), the reference value $\delta_{k+1}$ which is calculated in accordance with the following formula:

$$\delta_{k+1}=2C_{kave}y_k+1$$

is output from the reference value calculation unit 143. In a case where the determination value $M_k$=(10) (Zk<−1: "−merge"), the reference value $\delta_{k+1}$ which is calculated in accordance with the following formula:

$$\delta_{k+1}=2C_{kave}-y_k-1$$

is output from the reference value calculation unit 143. In a case where the determination value $M_k$=(00) (−1≤Zk≤1 : "no merge"), the reference value $\delta_{k+1}$ which is calculated in accordance with the following formula:

$$\delta_{k+1}=2C_{kave}-\delta_k$$

is output from the reference value calculation unit 143. These reference values $\delta_{k+1}$ are respectively obtained by correcting the reference values ($\delta_{k+1}$=yk −1), ($\delta_{k+1}$=yk+1) and ($\delta_{k+1}$=−$\delta_k$) obtained by the process shown in FIG. 5 using the center value $C_{kave}$.

Figure 18:
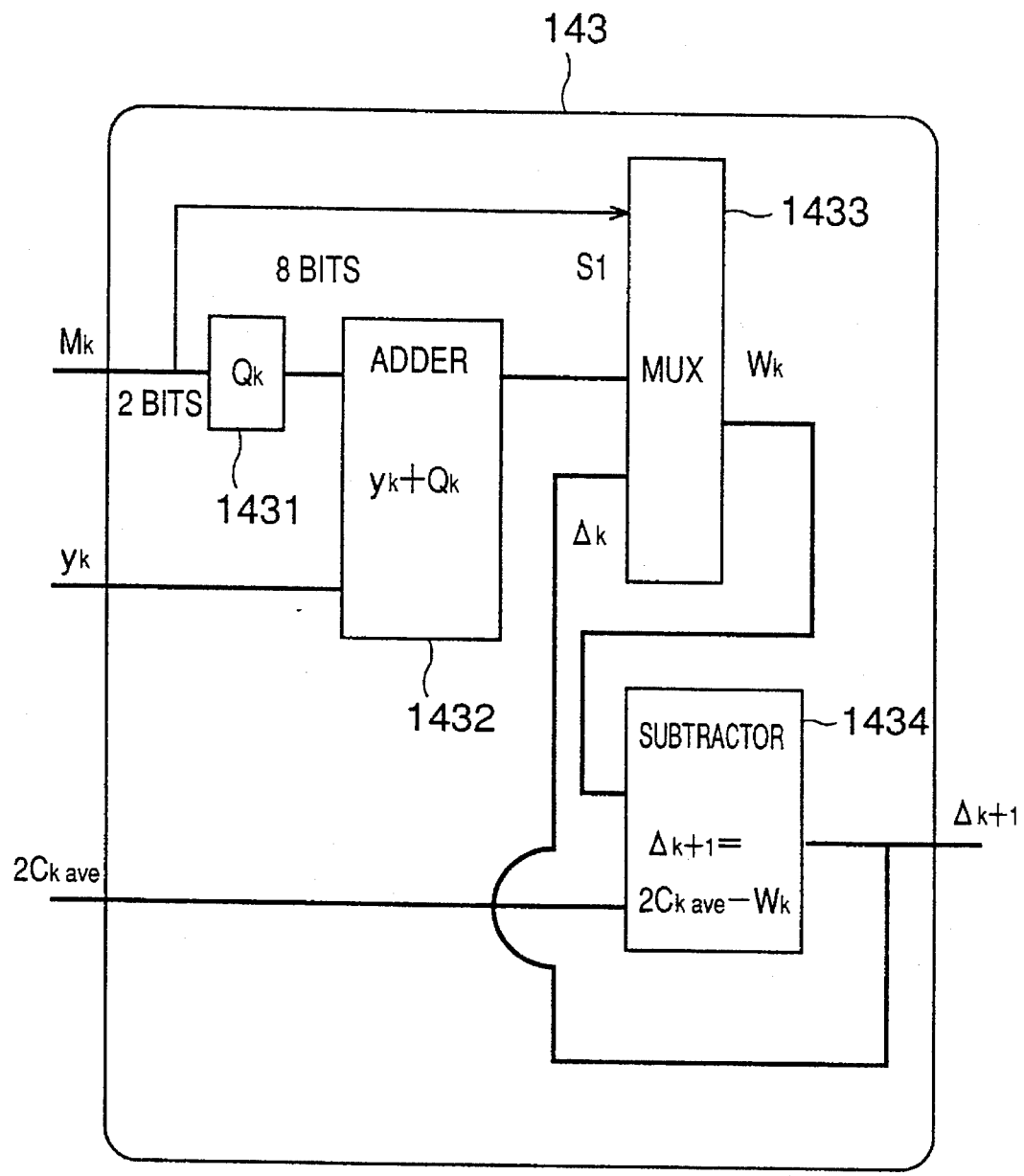
FIG. 18 is a block diagram illustrating a structure of the reference value calculation unit.

To achieve the above process, the reference value calculation unit 143 is formed, for example, as shown in FIG. 18. That is, the reference value calculation unit 143 has a constant output circuit 1431, an adder 1432, a multiplexer 1433 and a subtracter 1434. The constant output circuit 1431 outputs a constant value $Q_k$ (8 bits) depending on the determination value $M_k$. In a case where the determination value $M_k$=01 ("+merge"), the constant value $Q_k$=−1 is output. In a case where the determination value $M_k$=10 ("−merge"), the constant value $Q_k$=1 is output. In a case where the determination value $M_k$=00 ("no merge"), the constant value $Q_k$=0 is output. The adder 1432 adds the input data $y_k$ and the constant value $Q_k$ from the constant output circuit 1431 and outputs an adding value $y_k+Q_k$. The multiplexer 1433 selects, in accordance with the determination value $M_k$ from the merge determination unit 141, either the adding value $y_k+Q_k$ or the reference value $\delta_k$ which has been calculated in the previous timing by the subtracter 1434. That is, in cases where $M_k$=01 and $M_k$=01, the adding value $y_k+Q_k$ from the adder 1432 is selected, and in a case where $M_k$=00, the reference value $\delta_k$ which has been previously calculated is selected. The subtracter 1434 subtracts a value $W_k$ ($y_k+Q_k$ or $\delta_k$) selected by the multiplexer 1433 from $2C_{kave}$ from the center value calculation unit 142, and outputs the next reference value $\delta_{k+1}$.

Figure 16:
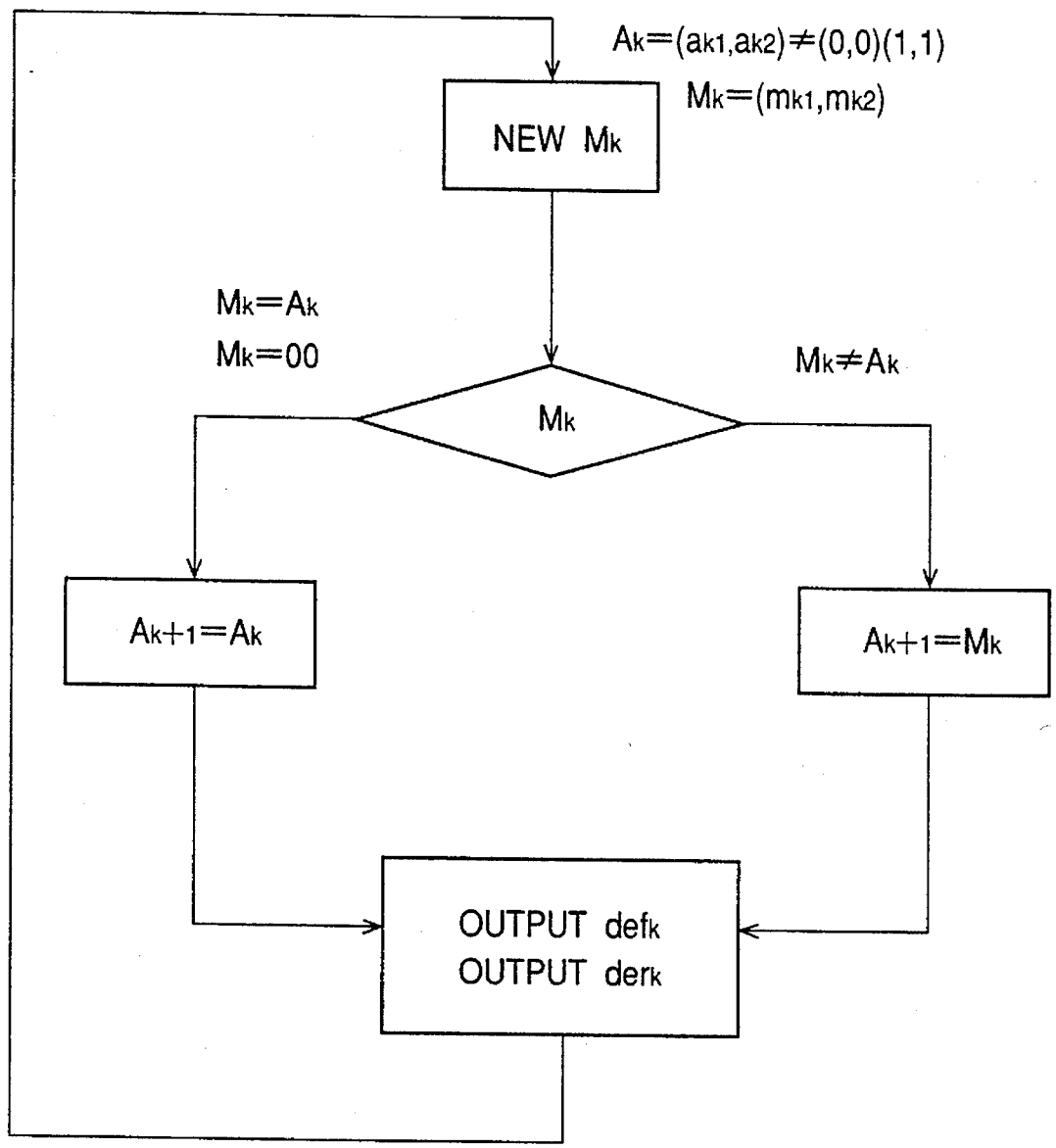
FIG. 16 is a flow chart illustrating a process in a merge detecting unit shown in FIG. 12.

The merge detecting unit 144 detects, based on the determination result $M_k$ from the merge determination unit 141, change from the "−merge" to the "+merge" and change from the "+merge" to the "−merge". A process in the merge detecting unit 144 is carried out in accordance with a flow chart shown in FIG. 16. In the process, a variable $A_k$=($a_{k1}$, $a_{k2}$) which is not equal to (0, 0) and (1, 1) is defined. In cases where $M_k$=(00) ("no merge") and $M_k$=$A_k$ ("+merge" or "merge" which is not changed), the variable which has been obtained in the previous timing is not changed ($A_k$ =$A_{k+1}$). In a case where $M_k$ is not equal to $A_k$ (the change from the "+merge" to the "−merge" or the change from the "−merge" to the "+merge"), the variable $A_{k+1}$ is set to the determination value $M_k$ which has been obtained at the previous timing ($A_{k+1}$=$M_k$). The leading edge data $def_k$ is calculated in accordance with the following formula:

$$def_k=a_{k1}\cdot\overline{a_{k2}}\cdot\overline{m_{k1}}\cdot m_{k2}.$$

The trailing edge data $der_k$ is calculated in accordance with the following formula:

$$der_k=\overline{a_{k1}}\cdot a_{k2}\cdot m_{k1}\cdot\overline{m_{k2}}.$$

In a case where the state of the input data $y_k$ is changed from the "−merge" to the "+merge", the leading edge data $def_k$ is equal to one ($def_k$=1). In other cases, the leading edge data $def_k$ is equal to zero ($def_k$=0). In a case where the state of the input data $y_k$ is changed from the "+merge" to the "−merge", the trailing edge data $der_k$ is equal to one ($der_k$=1). In other cases, the trailing edge data $der_k$ is equal to zero ($der_k$=0).

Figure 20:
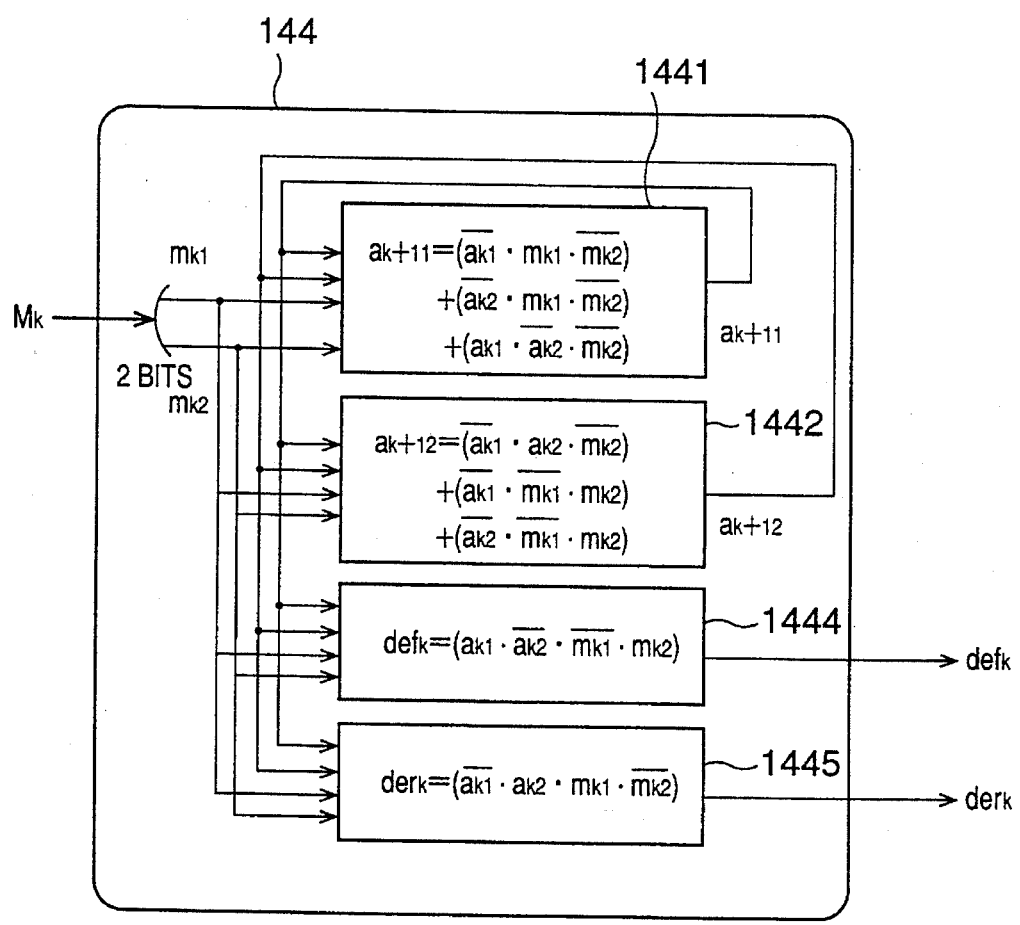
FIG. 20 is a block diagram illustrating a structure of the merge detecting unit.

To achieve the above process, the merge detecting unit 144 is formed, for example, as shown in FIG. 20. That is, the merge detecting unit 144 has a first calculating circuit 1441, a second calculating circuit 1442, a third calculating circuit 1444 and a fourth calculating circuit 1445. The first calculating circuit 1441 calculates $a_{k+11}$ using the determination value $M_k$ ($m_{k1}$ $m_{k2}$) and the variable $A_k$ ($a_{k1}$ $a_{k2}$) in accordance with the following formula:

$$a_{k+11}=(\overline{a_{k1}}\cdot m_{k1}\cdot \overline{m_{k2}})+(\overline{a_{k2}}\cdot m_{k1}\cdot \overline{m_{k2}})+(a_{k1}\cdot \overline{a_{k2}}\cdot \overline{m_{k2}}).$$

The second calculating circuit 1442 calculates $a_{k+12}$ in accordance with the following formula:

$$a_{k+12}=(\overline{a_{k1}}\cdot a_{k2}\cdot \overline{m_{k1}})+(a_{k1}\cdot \overline{m_{k1}}\cdot m_{k2})+(\overline{a_{k2}}\cdot \overline{m_{k1}}\cdot m_{k2}).$$

The third calculating circuit 1444 calculates the leading edge date $def_k$ in accordance with the following formula:

$$def_k=a_{k1}\cdot \overline{a_{k2}}\cdot \overline{m_{k1}}\cdot m_{k2}.$$

The fourth calculating circuit 1445 calculates the trailing edge data $def_k$ in accordance with the following formula:

$$der_k=\overline{a_{k1}}\cdot a_{k2}\cdot m_{k1}\cdot \overline{m_{k2}}$$

In the maximum likelihood data detecting circuit 50, the third calculating circuit 1444 of the merge detecting unit 144 outputs, based on the data $y_k$ sampled in synchronism with the leading edge synchronizing clock (4), the leading edge data (6) ($def_k$). The fourth calculating circuit 1445 of the merge detecting unit 144 outputs, based on the data $y_k$ sampled in synchronism with the trailing edge synchronizing clock (5), the trailing edge data (6) ($der_k$).

In the above embodiment, the maximum likelihood data detecting circuit 50 detects both the leading edge data $def_k$ and the trailing edge data $der_k$ in synchronism with the composite clock obtained by switching the leading edge synchronizing clock corresponding to the leading edges of the reproduction signal and the trailing edge synchronizing clock corresponding to the trailing edges of the reproduction signal. That is, the clock is switched so that the leading edge synchronizing clock is used to detect the leading edge data and the trailing edge synchronizing clock is used to detect the trailing edge data. Thus, it is not necessary to divide the maximum likelihood data detecting circuit into two units: the first maximum likelihood data detecting circuit 25a for the leading edge data and the second maximum likelihood data detecting circuit 25b for the trailing edge data as shown in FIG. 2. As a result, the size of the data reproducing system can be minimized.

In addition, according to the switching circuit 51 having the structure shown in FIG. 9, the output control of the leading edge synchronizing clock and the trailing edge synchronizing clock is performed by signals Q and $\overline{Q}$ which are obtained by delaying the switching signal inverted immediately after the leading edge data or the trailing edge data is output. Thus, even if there is the phase difference between the leading edge synchronizing signal and the trailing edge synchronizing signal, the synchronizing clock can be switched at appropriate timing.

The present invention is not limited to the aforementioned embodiments, and variations and modifications may be made without departing from the scope of the claimed invention.

What is claimed is:

1. A data reproducing system obtaining a reproduction signal via a head from an optical disk recording medium in which signals obtained by modulation of recording data in accordance with a rule corresponding to a partial response characteristic have been recorded, and generating a data signal corresponding to the recording data based on the reproduction signal, said data reproducing system comprising:

clock generating means for generating a synchronizing clock based on the reproduction signal corresponding to the recording data;

said clock generating means including first clock generating means for generating a first synchronizing clock in which phase synchronization is performed based on leading edges of the reproduction signal; and second clock generating means for generating a second synchronizing clock in which phase synchronization is performed based on trailing edges of the reproduction signal; and signal generating means, operating in synchronism with the synchronizing clock generated by said clock generating means, for sampling levels of the reproduction signal and for generating the data signal from the sampled levels in accordance with a maximum likelihood sequence estimation method, said signal generating means including first maximum likelihood data detecting means for sampling levels of the reproduction signal in synchronism with the first synchronizing clock from said first clock generating means and for generating from the sampled levels a first data signal corresponding to the leading edges of the reproduction signal in accordance with the maximum likelihood sequence estimation method;

second maximum likelihood data detecting means for sampling levels of the reproduction signal in synchronism with said second synchronizing clock from said second clock generating means and for generating from the sampled levels a second data signal corresponding to the trailing edges of the reproduction signal in accordance with the maximum likelihood sequence estimation method; and signal composition means for composing the first data signal from said first maximum likelihood data detecting means and the second data signal from said second maximum likelihood data detecting means and for generating the data signal to be output.

2. The system as claimed in claim 1, wherein said signal composition means comprises:

logical sum composition means for generating a logical sum signal of the first data signal and the second data signal; and data discriminating means for performing data discrimination for the logical sum signal from said logical sum composition means in synchronism with a predetermined synchronizing clock.

3. The system as claimed in claim 2, wherein said data discriminating means has discriminating clock generating means for generating the predetermined synchronizing clock used for the data discrimination based on at least one of the first and second synchronizing clocks.

4. A data reproducing system obtaining a reproduction signal via a head from an optical disk recording medium in which signals obtained by modulation of recording data in accordance with a rule corresponding to a partial response characteristic have been recorded and generating a data signal corresponding to the recording data based on the reproduction signal, said data reproducing system comprising:

clock generating means for generating a synchronizing clock based on the reproduction signal corresponding to the recording data;

said clock generating means including first clock generating means for generating a first synchronizing clock in which phase synchronization is performed based on leading edges of the reproduction signal;

second clock generating means for generating a second synchronizing clock in which phase synchronization is performed based on trailing edges of the reproduction signal; and clock composition means for composing the first synchronizing clock and the second synchronizing clock and for outputting a composite clock; and signal generating means, operating in synchronism with the synchronizing clock generated by said clock generating means, for sampling the levels of the reproduction signal and for generating the data signal from the sampled levels in accordance with a maximum likelihood sequence estimation method, said signal generating means including sampling means for sampling levels of the reproduction signal in synchronism with the composite clock from said clock composition means;

first means for generating from the sampled levels a leading edge data signal corresponding to the leading edges of the reproduction signal in accordance with the maximum likelihood sequence estimation method;

second means for generating from the sampled levels a trailing edge data signal corresponding to the trailing edges of the reproduction signal in accordance with the maximum likelihood sequence estimation method; and data composition means for composing the leading edge data signal and the trailing edge data signal and for generating the data signal to be output.

5. The system as claimed in claim 4, wherein said clock composition means has clock switching means for switching the first synchronizing clock to the second synchronizing clock immediately after said first means of said signal generating means outputs the leading edge data signal, and for switching the second synchronizing clock to the first synchronizing clock immediately after said second means of said signal generating means outputs the trailing edge data signal.

6. The system as claimed in claim 5, wherein said clock switching means comprises:

switching signal generating means for a switching signal in which a first state is maintained from an output time of the trailing edge data signal to an output time of the leading edge data signal, and a second state is maintained from the output time of the leading edge data signal to the output time of the trailing edge data signal;

delay means for delaying the switching signal from said switching signal generating means; and output control means for outputting the first synchronizing clock when the delayed switching signal is in the first state and for outputting the second synchronizing clock when the delayed switching signal is in the second state.

7. The system as claimed in claim 3, wherein said discriminating clock generating means has an inverting means for inverting one of the first and second synchronizing clocks.

8. The system as claimed in claim 1, wherein said clock generating means comprises:

binary signal generating means for generating a binary signal based on a level which is a substantially center level of an amplitude of the reproduction signal corresponding to the recording data;

edge detecting means for detecting edges of the binary signal; and means for generating the synchronizing clock synchronized with the edges detected by said edge detecting means.

9. The system as claimed in claim 1, wherein said optical disk recording medium is a magneto-optical disk.

* * * * *

UNITED STATES PATENT AND TRADEMARK OFFICE
CERTIFICATE OF CORRECTION

PATENT NO. : 5,598,392
DATED : January 28, 1997
INVENTOR(S) : Izumi et al.

It is certified that error appears in the above-indentified patent and that said Letters Patent is hereby corrected as shown below:

Column 6, line 13, delete "dada" and insert --data--.

Column 6, line 17, delete "sing" and insert --sign--.

Column 6, line 56, delete "Table-1" and insert --Table 1--.

Column 8, line 31, delete "rage" and insert --range--.

Column 8, line 35, delete "sing" and insert --sign--.

UNITED STATES PATENT AND TRADEMARK OFFICE
CERTIFICATE OF CORRECTION

PATENT NO. : 5,598,392  Page 2 of 2
DATED : January 28, 1997
INVENTOR(S) : Izumi et al.

It is certified that error appears in the above-indentified patent and that said Letters Patent is hereby corrected as shown below:

Column 13, line 57, delete "$\delta_{k+1}=2C_{kave}y_k+1$"

and insert --$\delta_{k+1}=2C_{kave}-y_k+1$--.

Column 14, line 43, delete " "merge" " and insert --merge--.

Signed and Sealed this

Seventh Day of October, 1997

Attest:

BRUCE LEHMAN

*Attesting Officer*     *Commissioner of Patents and Trademarks*